(12) United States Patent
Oikawa

(10) Patent No.: US 8,906,341 B2
(45) Date of Patent: Dec. 9, 2014

(54) HYDROGEN STORAGE METHOD, HYDROGEN GENERATING METHOD, HYDROGEN STORAGE APPARATUS AND HYDROGEN GENERATING APPARATUS

(71) Applicant: TAANE Co., Ltd., Miyagi (JP)

(72) Inventor: Taneaki Oikawa, Miyagi (JP)

(73) Assignee: TAANE Co., Ltd., Miyagi (JP)

( * ) Notice: Subject to any disclaimer, the term of this patent is extended or adjusted under 35 U.S.C. 154(b) by 104 days.

(21) Appl. No.: 13/730,315

(22) Filed: Dec. 28, 2012

(65) Prior Publication Data

US 2013/0115161 A1 May 9, 2013

Related U.S. Application Data

(63) Continuation of application No. PCT/JP2010/061614, filed on Jul. 8, 2010.

(51) Int. Cl.
*C01B 3/08* (2006.01)
*C01B 3/06* (2006.01)

(52) U.S. Cl.
CPC ............. *C01B 3/068* (2013.01); *C01B 3/065* (2013.01); *Y02E 60/362* (2013.01); *Y02E 60/327* (2013.01); *Y02E 60/364* (2013.01)
USPC .......................................... 423/657; 423/644

(58) Field of Classification Search
USPC ................ 423/644, 648.1, 657, 652; 420/900
See application file for complete search history.

(56) References Cited

U.S. PATENT DOCUMENTS

| | | | |
|---|---|---|---|
| 7,306,780 B1 * | 12/2007 | Kravitz et al. | 423/648.1 |
| 7,501,008 B2 * | 3/2009 | Eshraghi et al. | 95/55 |
| 2008/0292541 A1 | 11/2008 | Kamada | |

FOREIGN PATENT DOCUMENTS

| | | |
|---|---|---|
| JP | 2004-174480 A | 6/2004 |
| JP | 2005-245265 A | 9/2005 |
| WO | WO 2007/055146 A1 | 5/2007 |

* cited by examiner

*Primary Examiner* — Stanley Silverman
*Assistant Examiner* — Syed Iqbal
(74) *Attorney, Agent, or Firm* — Slater & Matsil, L.L.P.

(57) ABSTRACT

Disclosed is a method for storing hydrogen, a method for generating hydrogen, a hydrogen storing device, and a hydrogen generating device. In a disclosed method for storing hydrogen, water that is treated so as to include hydrogen ions in a state the ions can be changed into protium is prepared, and hydrogen is stored by supplying a hydrogen-containing substance or a substance that generates hydrogen, for example, Mg, into the water. Preferably, the hydrogen-containing substance is sodium borohydride ($NaBH_4$). Preferably, the water is ionized hydrogen water treated with a metal hydride, and the metal hydride is at least one among an alkali metal, an alkaline earth metal, a group 13 metal, and a group 14 metal.

19 Claims, 33 Drawing Sheets

Schematic view of hydrogen that can be changed into protium

ⓔ indicates an electron

Fig. 6 The pH, ORP, and dissolved hydrogen where hydrogen gas was blown in.

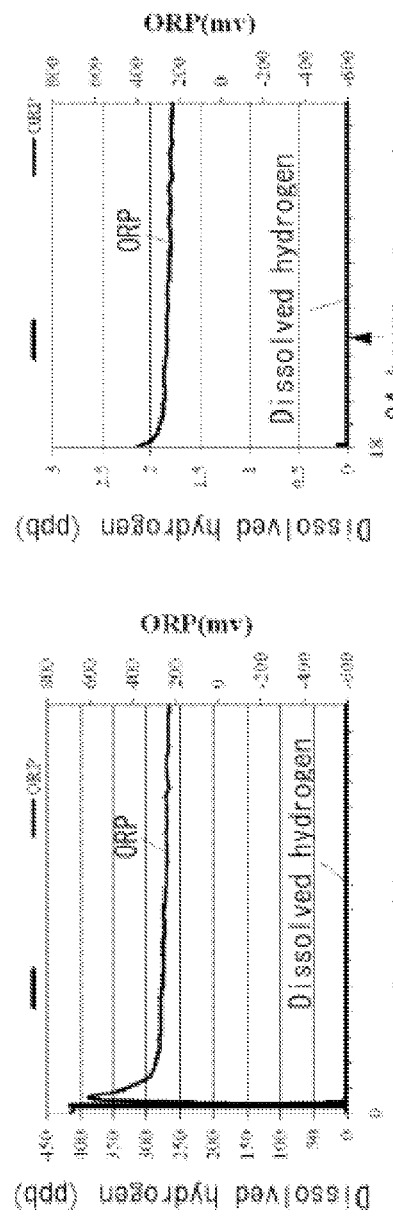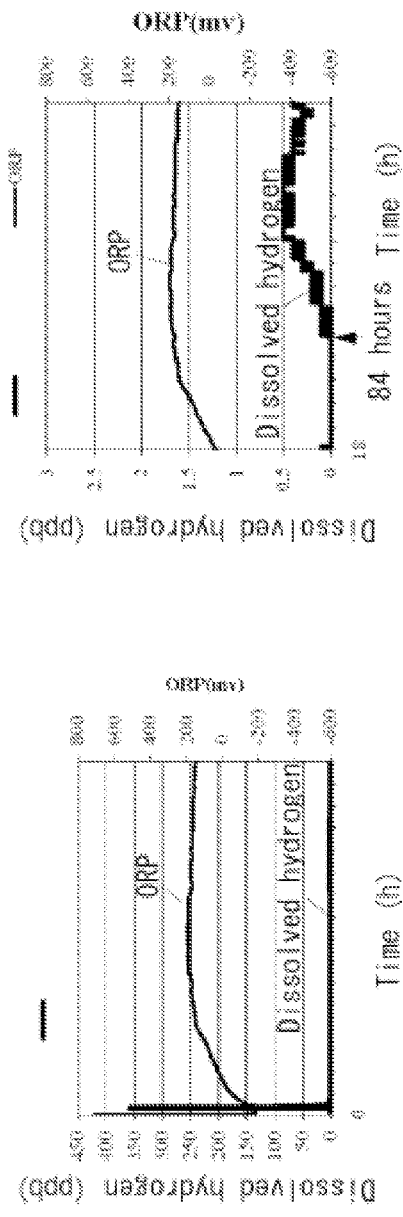
Fig. 7

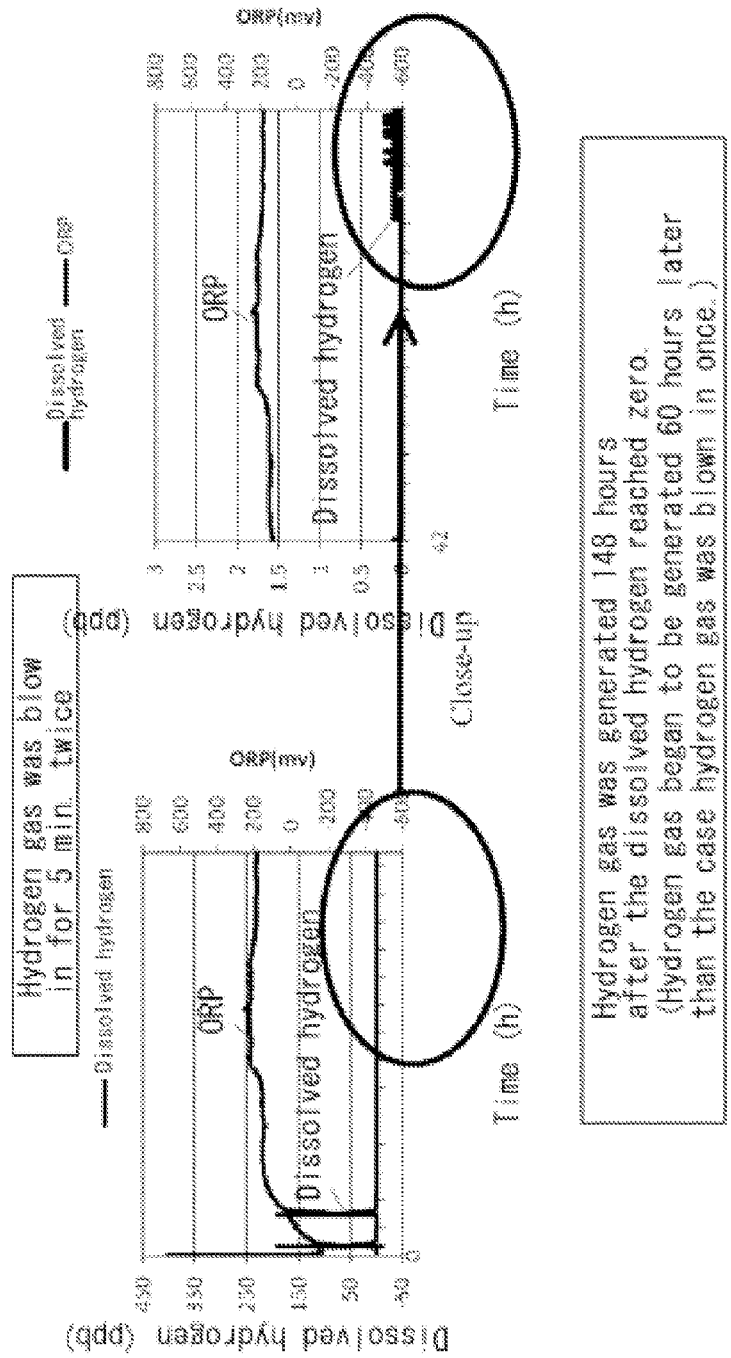

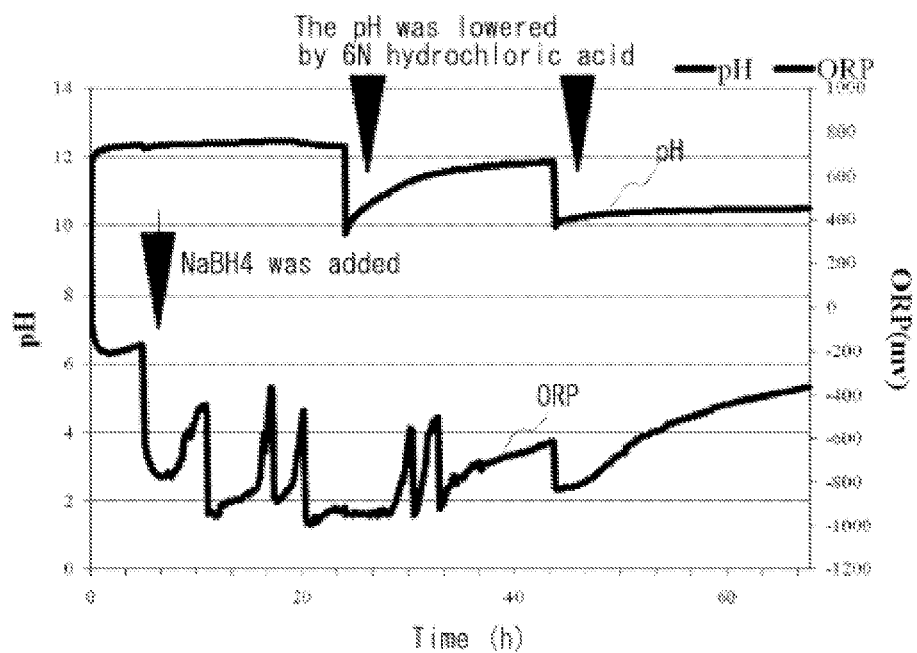
Fig. 16 Conditioned water + sodium borohydride (NaBH4)
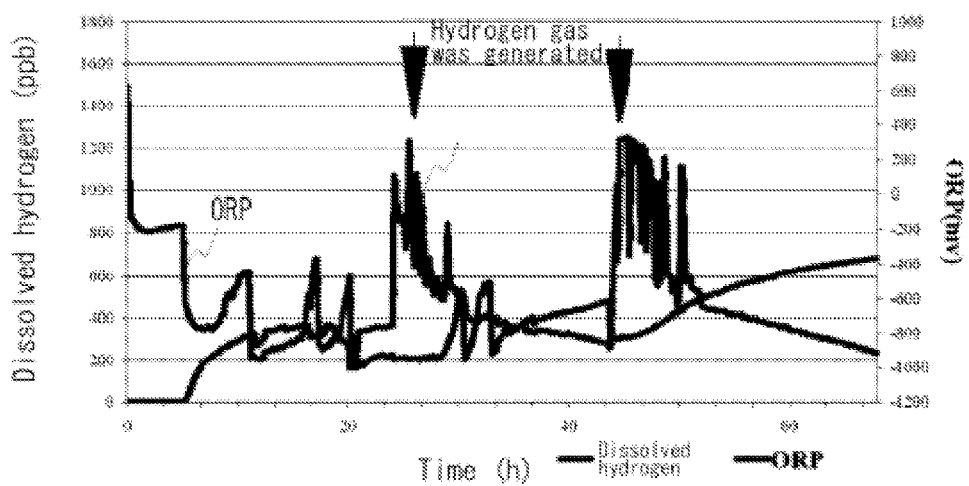
Fig. 17 More hydrogen gas was generated than by a first addition by a second addition.

In a case of magnesium hydride (MgH2) + sodium borohydride (NaBH4)

In a case of magnesium hydride (MgH2) + calcium hydride (CaH2)

Hydrogen was generated when conditioned water + metal magnesium + hydrochloric acid were added to lower pH.

Fig. 37
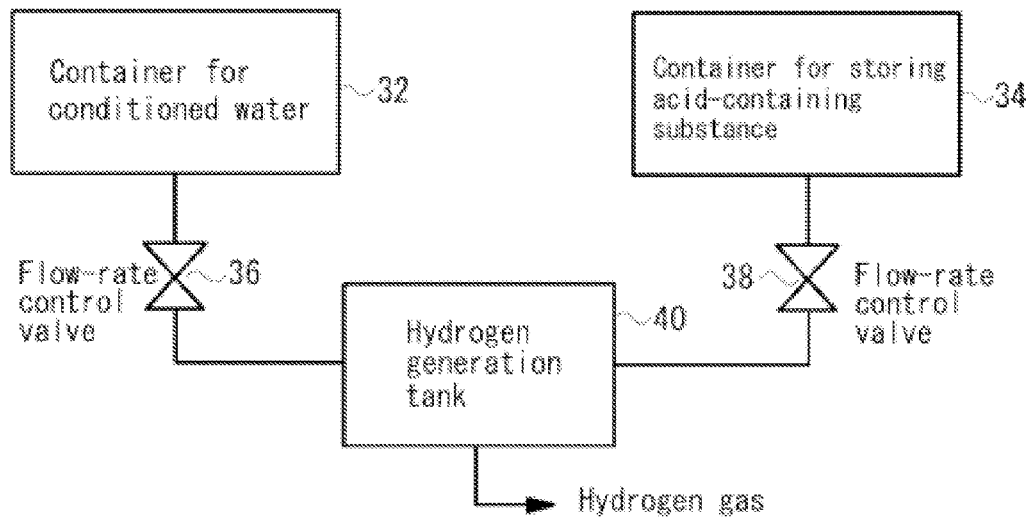
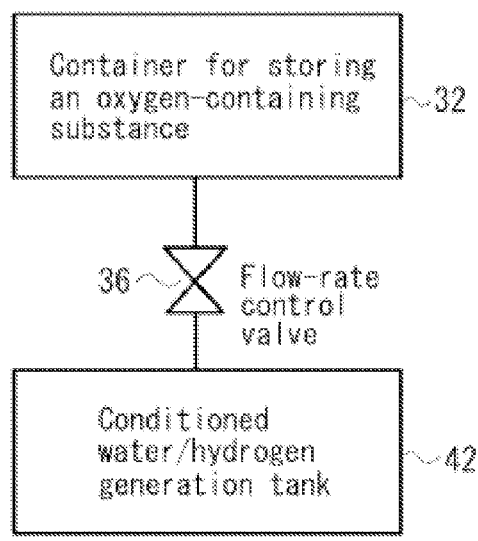

Conditioned water = hydrogen balanced water = ionized hydrogen water

HYDROGEN STORAGE METHOD, HYDROGEN GENERATING METHOD, HYDROGEN STORAGE APPARATUS AND HYDROGEN GENERATING APPARATUS

This application is a continuation of co-pending International Application No. PCT/JP2010/061614, which was filed on Jul. 8, 2010 and is incorporated herein by reference.

TECHNICAL FIELD

The present invention relates to a method for storing hydrogen, a method for generating hydrogen, an apparatus for storing hydrogen, and an apparatus for generating hydrogen.

BACKGROUND

Minus hydrogen ions have reducing power and are capable of, when taken into a body, effectively eliminating active oxygen (free radical) generated in the body. Hydrogen reacts with oxygen to generate water, and thus hydrogen has been attracting attention also as a global environment-friendly, clean energy resource.

The present inventor proposed a method for manufacturing a magnetic ceramic ball having a strong reducing potency (Japanese Patent document JP-B-4,218,939, published Jun. 24, 2004 as JP2004-174480, entitled "Method for Manufacturing Magnetic Ceramic Ball having Strong Reducing Characteristic"), and placing the ceramic ball in water, thereby causing the ceramic ball to generate hydrogen bubbles from the north pole thereof.

SUMMARY OF THE INVENTION

If it becomes possible to stably store hydrogen at room temperatures and take out the hydrogen as required, the use of hydrogen will expand, and especially, the use of hydrogen as an energy resource can be realized.

In one aspect, the present invention provides a new and innovative method for storing hydrogen, a method for generating hydrogen, an apparatus for storing hydrogen, and an apparatus for generating hydrogen.

A method for storing hydrogen according to embodiments of the present invention comprises producing conditioned water in which hydrogen is changed into protium, and providing a hydrogen-containing substance or a substance that generates hydrogen into the conditioned water, thereby storing hydrogen. Preferably, the hydrogen-containing substance may be a hydrogen-containing gas, or any metal hydride, for example, sodium borohydride ($NaBH_4$), calcium hydride ($CaH_2$), or magnesium hydride ($MgH_2$). The metal hydride may be an alkali metal, an alkaline earth metal, a Group 13 or Group 14 metal. The conditioned water contains hydrogen ions that can be changed into protium.

A method for generating hydrogen according to the present invention comprises producing conditioned water in which hydrogen is changed into protium, and lowering pH of the conditioned water, thereby generating hydrogen gas. Preferably, the method for generating hydrogen further comprises a step of storing hydrogen by providing into the conditioned water a hydrogen-containing substance or a substance that generates hydrogen. Preferably, pH is lowered by a substance such as air, oxygen gas, or hydrochloric acid. The conditioned water contains hydrogen ions that can be changed into protium. Preferably, hydrogen is stored by treating the water with calcium hydride and providing sodium borohydride, and hydrogen is generated by adding hydrochloric acid thereto. It is also preferable that hydrogen is stored by treating water with magnesium hydride and providing sodium borohydride, and hydrogen is generated by adding hydrochloric acid thereto. Preferably, hydrogen is stored by treating water with calcium hydride and magnesium hydride and providing sodium borohydride, and hydrogen is generated by adding hydrochloric acid. Hydrogen is stored by providing a substance that generates hydrogen or a hydrogen-containing gas into water that is treated with a metal hydride, and hydrogen is generated by adding hydrochloric acid thereto. The metal hydride is at least one among an alkali metal, an alkaline earth metal, a Group 13 metal, and a Group 14 metal.

An apparatus for storing hydrogen according to the present invention comprises a container for containing conditioned water in which hydrogen is changed into protium, and a providing means for providing hydrogen to the conditioned water contained in the containing means. Preferably, a hydrogen-containing substance is a hydrogen-containing gas, sodium borohydride ($NaBH_4$), or a substance that generates hydrogen, for example, magnesium (Mg). In addition, the conditioned water contains hydrogen ions that can be changed into protium. A metal hydride may be an alkali metal, an alkaline earth metal, a Group 13 or Group 14 metal.

An apparatus for generating hydrogen according to the present invention comprises a containing means for containing conditioned water in which hydrogen is changed into protium, and a providing means for providing a substance that lowers pH of the conditioned water contained in the containing means. Preferably, the substance that lowers pH is air, oxygen gas, or hydrochloric acid. In addition, the conditioned water contains hydrogen that can be changed into protium. A metal hydride may be at least one among an alkali metal, an alkaline earth metal, a Group 13 metal, and a Group 14 metal.

According to the present invention, hydrogen can be stably stored, and hydrogen gas can be stably taken out.

BRIEF DESCRIPTION OF THE DRAWINGS

The more complete understanding of the present invention, and the advantages thereof, reference is now made to the following descriptions taken in conjunction with the accompanying drawing, in which:

FIG. 7 illustrates the relation between dissolved hydrogen and ORP, 84 hours after the hydrogen gas was blown into the tap water and the conditioned water in a condition of FIG. 6;

FIG. 9 shows graphs illustrating the relation between dissolved hydrogen and time wherein hydrogen gas was blown into conditioned water for 5 minutes twice;

FIG. 10, which includes

FIG. 16 illustrates temporal changes in ORP wherein sodium borohydride was provided into conditioned water, and then 6N hydrochloric acid was added thereto twice to lower pH;

FIG. 17 illustrates temporal changes in dissolved hydrogen (generation of hydrogen gas) in a condition of FIG. 16;

FIG. 37 illustrates an exemplary configuration of apparatuses for generating hydrogen according to embodiments of the present invention.

Embodiments for implementing the present invention are described below in detail with reference to the drawings.

DETAILED DESCRIPTION OF ILLUSTRATIVE EMBODIMENTS

Figure 1:
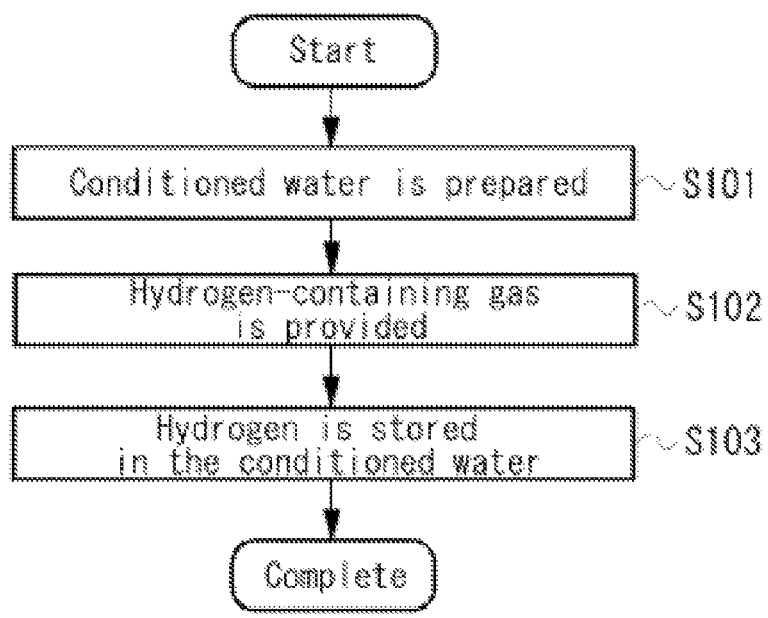
FIG. 1 is a flowchart illustrating a method for storing hydrogen according to an embodiment of the present invention.

FIG. 1 is a flowchart illustrating a method for storing hydrogen according to an embodiment of the present invention. The storing method comprises following steps. At first, water that is treated so that it contains hydrogen in a condition that can be changed into protium (hereinafter referred to conditioned water) is prepared (step S101), and then a hydrogen-containing gas is provided to the conditioned water (step S102), to stably store hydrogen in the conditioned water at room temperatures (step S103).

Figure 2:
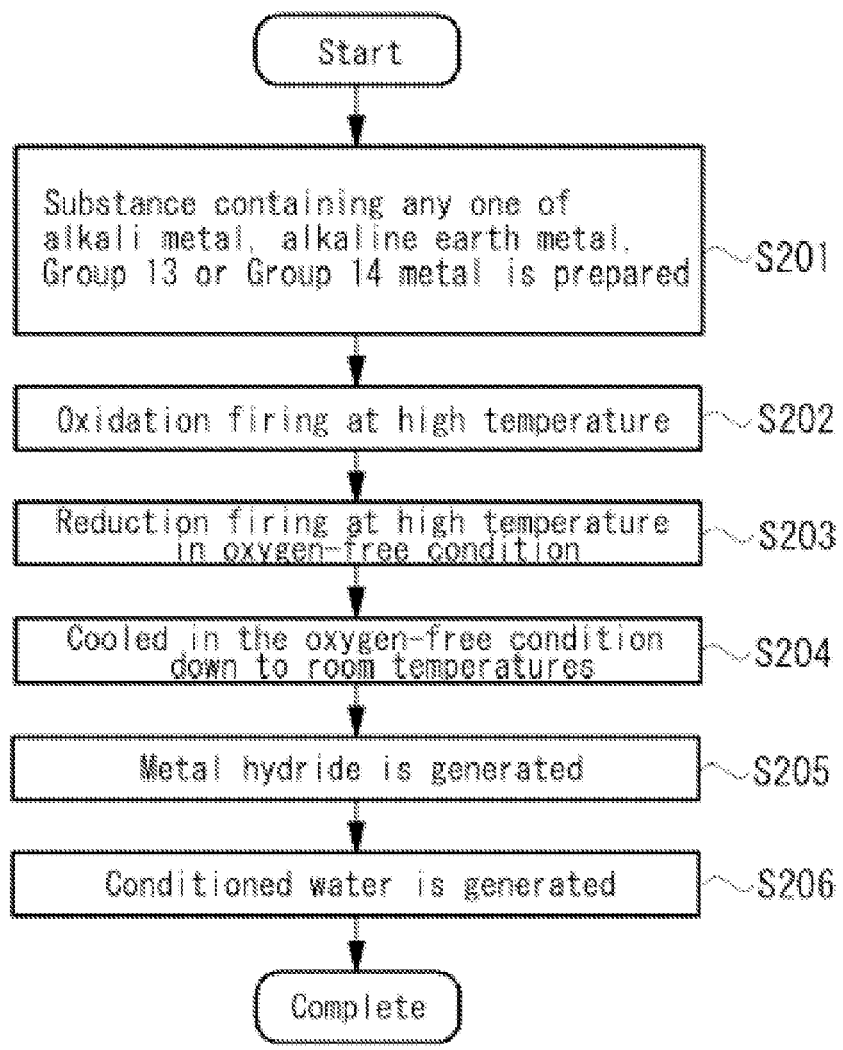
FIG. 2 is a flowchart illustrating a method for producing conditioned water according to an embodiment.

FIG. 2 is a flowchart illustrating a method for producing conditioned water. In this case, as an example, a method for producing conditioned water by means of a metal hydride or a hydrogen-containing metal is described. At first, any one among an alkali metal, an alkaline earth metal, a Group 13 metal, and a Group 14 metal in the periodic table, or a substance that contains at least one thereof is prepared (step S201). The substance then undergoes an oxidation firing at a high temperature (step S202).

The substance is then placed in a high temperature oxygen-free condition (e.g., in a furnace that contains hydrogen gas or a mixture of hydrogen gas and nitrogen gas) (step S203). For example, the substance is fired in a reductive atmosphere while keeping the temperature in the furnace described above at a temperature equal to or higher than 700 degrees centigrade for a given time. The substance is then cooled in the oxygen-free condition down to room temperatures (step S204).

As described above, a metal hydride or a hydrogen-containing metal is generated (step S205). By undergoing the steps of the high temperature oxidation firing, the high temperature oxygen-free reduction firing, and the room temperature oxygen-free condition, hydrogen gas $H_2$ in the furnace is turned into plasma as in $H_2 \Leftrightarrow H^+ + H^-$, and a metal hydride, i.e., an ionically bonded metal hydride, is generated. When the metal hydride is immersed into water, a change into protium occurs on the surface of the metal hydride, and conditioned water, which is alkali reducing mineral ion water that contains minus hydrogen ions ($H^-$), i.e., ionized hydrogen water, is generated (step S206).

Alternatively, the conditioned water may be generated also by using a ceramic ball described in Japanese Patent No. 4,218,939 or coral calcium described in Japanese Patent No. 4,404,657 both invented by the present inventor. In fabrication of the ceramic ball or coral calcium, during steps in a high temperature oxidation firing condition, a high temperature oxygen-free reduction firing condition, and a room temperature oxygen-free reducing condition, hydrogen gas $H_2$ contained in an atmosphere in the furnace is turned into plasma as in $H_2 \Leftrightarrow H^+ + H^-$, and silicon contained in clay in the material is dissolved in water and turned into ceramic. $CaCO_3$ contained in the coral calcium powder can be changed as in $CaCO_3 \rightarrow CaO \rightarrow CaH_2$, and a calcium hydride (calcium hydride=a kind of metal hydride that is an ionically bonded metal hydride) can be generated. Minus hydrogen ions can be generated also in such conditioned water.

Figure 3:
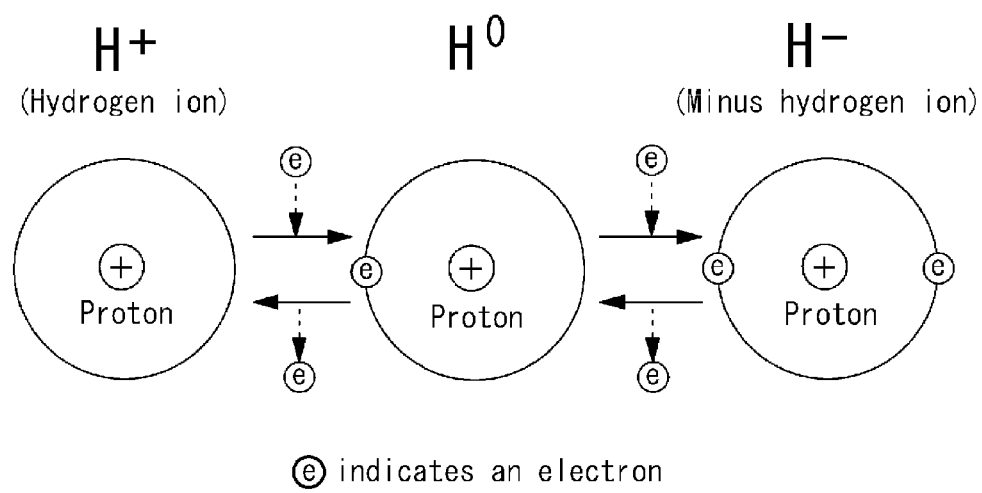
FIG. 3 is a schematic view of hydrogen that can be changed into protium.

FIG. 3 is a schematic view of hydrogen that can be changed into protium, and it is considered that a charge exchange occurs with hydrogen atoms as in $H_2 \Leftrightarrow 2H^0$, $H^+ \Leftrightarrow H^0$, $H_2 \Leftrightarrow 2H^-$, $H^+ \Leftrightarrow H^-$. In hydrogen engineering, a physicochemical reaction of $H^- \Leftrightarrow^{H+} 2e^-$ is experimentally confirmed, and thus it is certain that a change of hydrogen into protium occurs on a surface of a metal hydride placed in water. Therefore, on the structure surface of the metal hydride, the change of hydrogen into protium occurs, and a reaction of $H^+ \Leftrightarrow H^0 \Leftrightarrow H^-$ occurs, and thus minus hydrogen ions ($H^-$) are contained in the water treated with the metal hydride.

Figure 4:
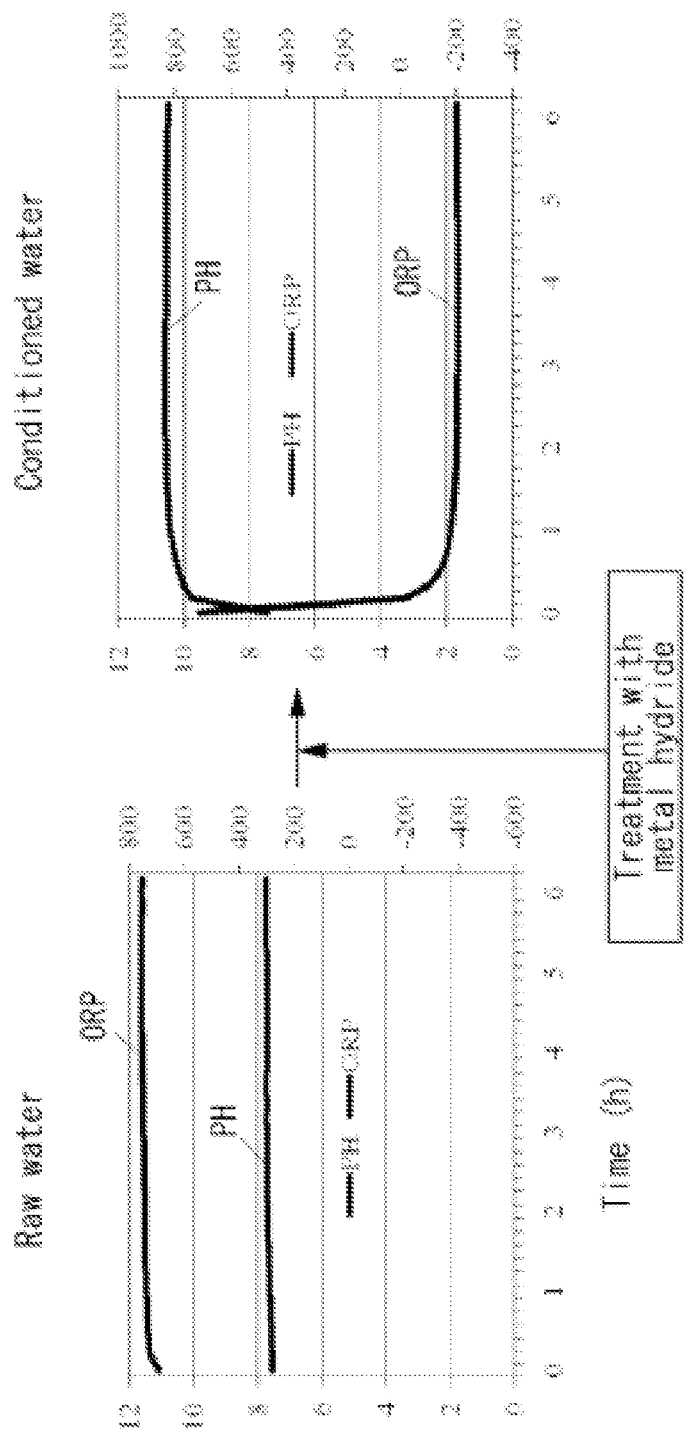
FIG. 4 shows graphs illustrating temporal changes in pH and oxygen reduction potential (ORP) of raw water (tap water) and conditioned water.

FIG. 4 is a graph for contrasting temporal changes in pH and ORP (oxidation reduction potential) of raw water (tap water) with those of conditioned water. In FIG. 4, the vertical axis indicates pH and ORP (mV), and the horizontal axis indicates time (h). In raw water, a condition in which pH is slightly greater than 7 continued, and ORP was almost constant at about 760 mV. On the other hand, in conditioned water, a change into protium occurred on the surface of the metal hydride, which controlled pH of surrounding water to a little under 11 and controlled ORP down to −260 mV, and the condition continued for a long time (6 hours in the graph). It can be therefore found that water property of the conditioned water was changed into a water property completely different from that of the raw water, and if the condition is created, a system can exist, in which minus hydrogen ions ($H^-$) can stably present as ions for a long time in alkali reducing mineral ion water in an oxygen-containing condition at room temperatures.

Figure 5:
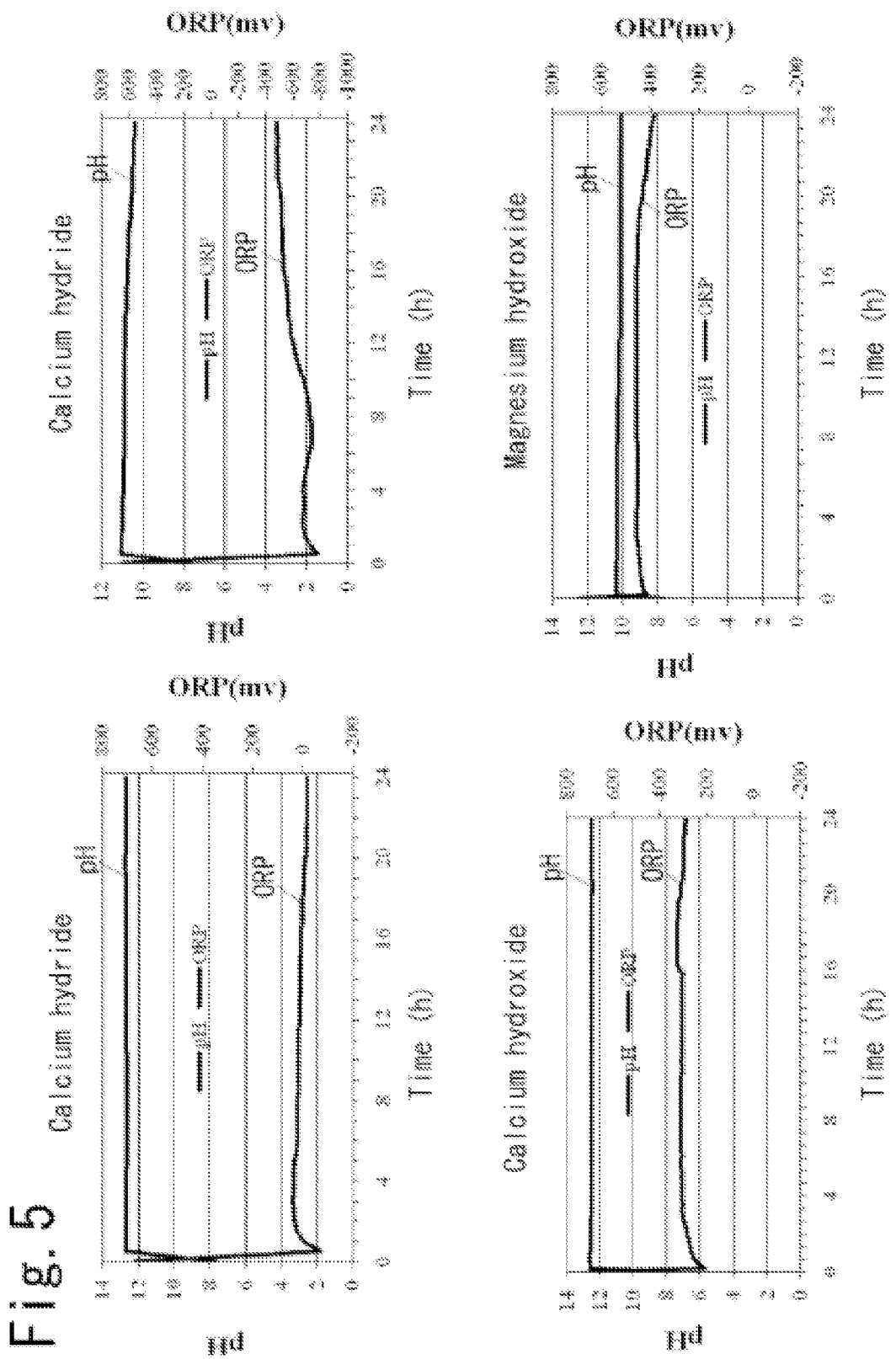
FIG. 5 illustrates pH and ORP of conditioned water that was conditioned with calcium hydride and magnesium hydride, respectively; and pH and ORP of water that contains calcium hydroxide and magnesium hydroxide, respectively.

FIG. 5 illustrates pH and ORP in water that was conditioned respectively with calcium hydride and magnesium hydride as a metal hydride; and as a comparison example, illustrates pH and ORP in water that contains calcium hydroxide and magnesium hydroxide, respectively. In the case of calcium hydride, pH was a little under 13 and ORP was about 0 mV, and the condition continued for 24 hours. In contrast, in the case of calcium hydroxide, pH was similarly a little below 13, but ORP was about 300 mV. In the case of magnesium hydride, pH was a little below 11 and ORP was in a range between −700 mV and a little below −500 mV for about 24 hours. In contrast, in the case of magnesium hydroxide, pH was about 10 and ORP was about 450 mV. As described above, it can be found that, in the conditioned water treated with calcium hydride or magnesium hydride, a system can exist, in which minus hydrogen ions ($H^-$) caused by a change of hydrogen into protium can be stably present as ions for a long time.

Figure 6:
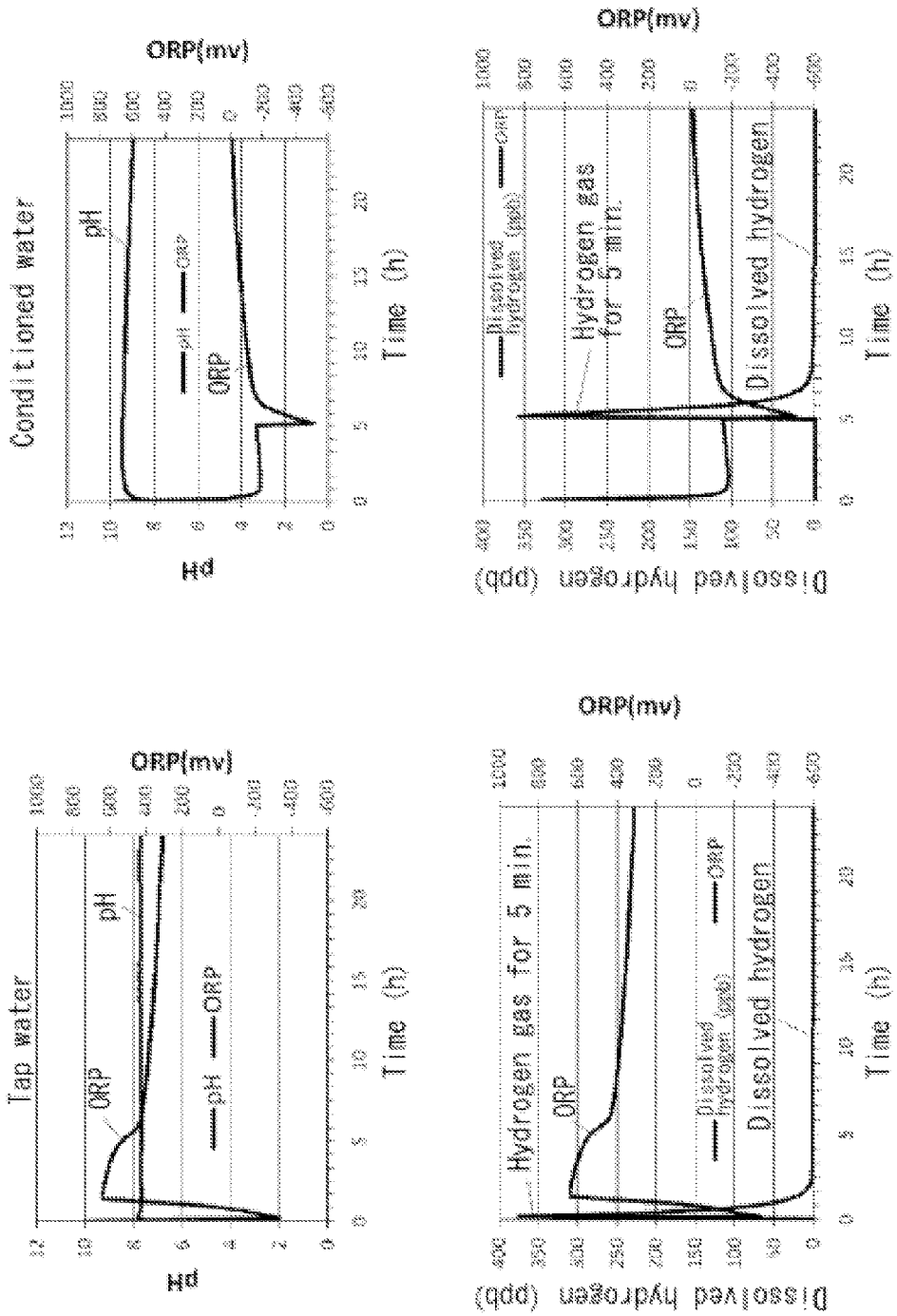
FIG. 6 illustrates the relation of pH, ORP, and dissolved hydrogen (ppb) wherein hydrogen gas was blown into tap water and conditioned water.

Referring again to FIG. 1, the step of providing a hydrogen-containing gas (step S102) and the step of storing hydrogen (step S103) are described. FIG. 6 illustrates the relation of pH, ORP, and dissolved hydrogen (ppb) wherein hydrogen gas was blown into tap water and conditioned water. Synchronously with the blowing of hydrogen gas into tap water, ORP temporally declined but then returned to a former value. In other words, even if hydrogen gas is blown into raw water, its reducing power cannot be maintained for a long time. In addition, the amount of dissolved hydrogen also temporally increased but then became to zero. On the other hand, it can be confirmed that, in the case hydrogen gas was blown into conditioned water, synchronously with the blowing, ORP declined and was kept at a negative potential, in other words, minus hydrogen ions ($H^-$) were present stably as ions.

Figure 8:
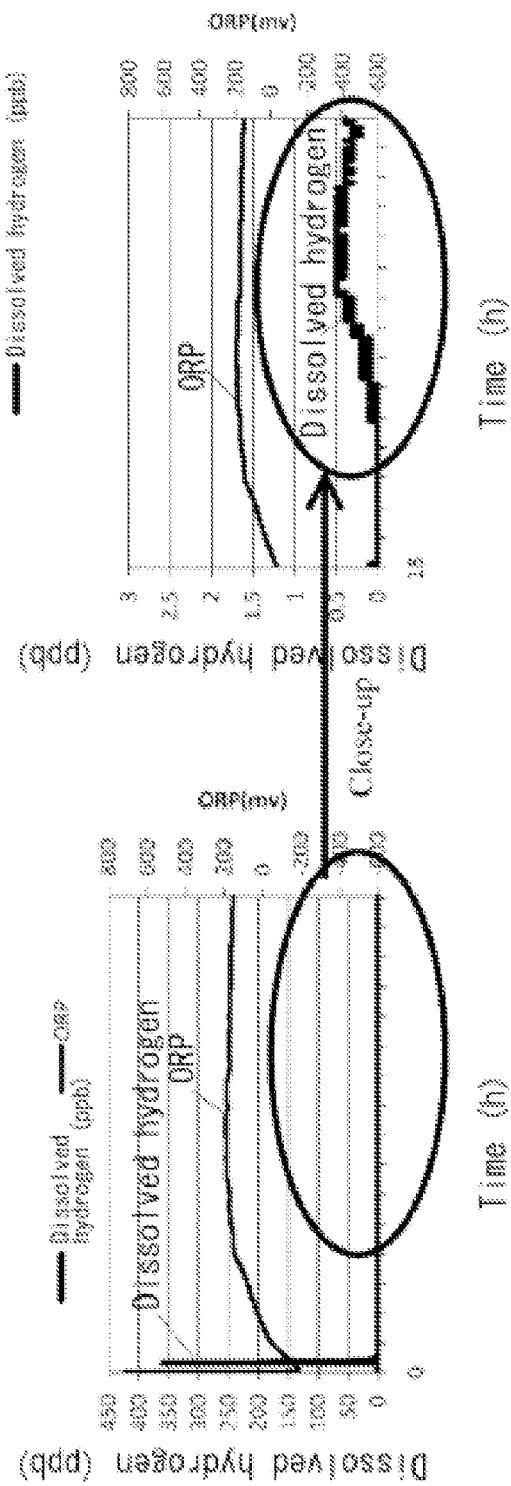
FIG. 8 shows graphs for illustrating a portion of dissolved hydrogen of the conditioned water being enlarged.

FIG. 7 illustrates the relation between dissolved hydrogen and ORP wherein 84 hours have elapsed after hydrogen gas was blown into the tap water and the conditioned water in a condition of FIG. 6. In the tap water, after the amount of dissolved hydrogen reached zero, hydrogen gas was not generated even if the water was stirred with a stirrer. On the other hand, in the conditioned water, hydrogen gas was generated again after 84 hours if it was continuously stirred with a stirrer after the dissolved hydrogen reached zero. In other words, the fact that hydrogen gas was generated from the conditioned water after the dissolved hydrogen reached zero by blowing hydrogen gas therein means that hydrogen can be stably stored in the conditioned water for a predetermined period at room temperatures. FIG. 8 shows graphs for illustrating a portion of dissolved hydrogen of the conditioned water being enlarged. After about 84 hours, hydrogen gas was generated from a condition in which the amount of dissolved hydrogen was zero.

FIG. 9 is a graph illustrating the relation between dissolved hydrogen and time wherein hydrogen gas was blown into conditioned water for 5 minutes twice. In the case hydrogen gas was blown in twice, hydrogen gas was generated 148 hours after the dissolved hydrogen reached zero. Hydrogen gas began to be generated 60 hours later than the case hydrogen gas was blown in once. In other words, it can be confirmed that hydrogen was stably stored for a longer time than the case hydrogen gas was blown in once.

As described above, it is considered that hydrogen that is changed into protium is present in the conditioned water in a condition as in $H^0_2 \Leftrightarrow H^+ + H^-$, and if hydrogen gas is blown therein, hydrogen gas is stored stably in a condition that is changed into protium or ionized. Although hydrogen gas was blown into the conditioned water in the examples described above, a hydrogen-containing substance, for example, sodium borohydride ($NaBH_4$), or a substance that generates hydrogen, such as Mg, may also be used, other than hydrogen gas.

Figure 10A:
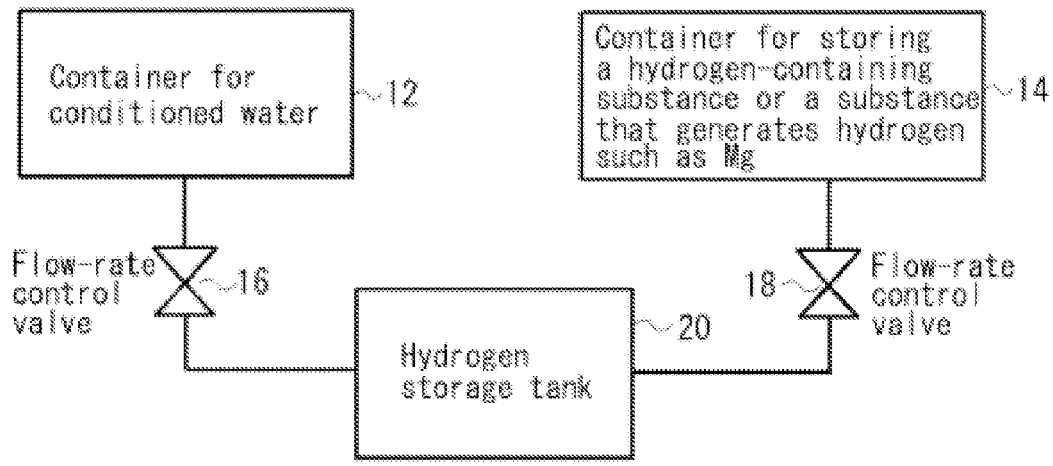
FIGS. 10A and 10B, illustrates examples of a configuration of apparatuses for storing hydrogen according to an exemplary embodiment.
Figure 10B:
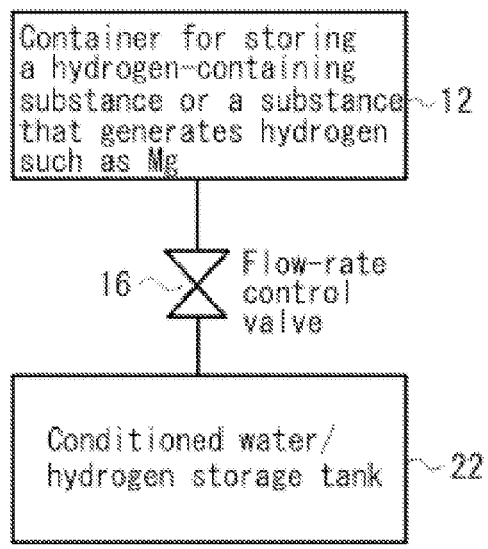

FIG. 10, which includes FIGS. 10A and 10B, illustrates an exemplary configuration of apparatuses for storing hydrogen. An apparatus for storing hydrogen 10 comprises a container 12 for containing conditioned water, a container 14 for containing a hydrogen-containing substance such as hydrogen gas, and a hydrogen storage tank 20. The container 12 for the conditioned water is connected to the hydrogen storage tank 20 through a flow-rate control valve 16 by means of a pipe, for example. The container 14 is connected to the hydrogen storage tank 20 through a flow-rate control valve 18 by means of a pipe, for example. The flow-rate controlled conditioned water and the flow-rate controlled hydrogen-containing substance are provided to the hydrogen storage tank 20, where the conditioned water in which hydrogen is stored is contained.

As further shown in FIG. 10B, an apparatus for storing hydrogen 10A may have a configuration that comprises a container 12 for containing a hydrogen-containing substance, and a conditioned water/hydrogen storage tank 22. In this case, a hydrogen-containing substance or a substance that generates hydrogen such as Mg is provided through a flow-rate control valve 16 to the tank 22 that contains the conditioned water, and hydrogen is stored in the conditioned water in the tank 22.

Figure 11A:
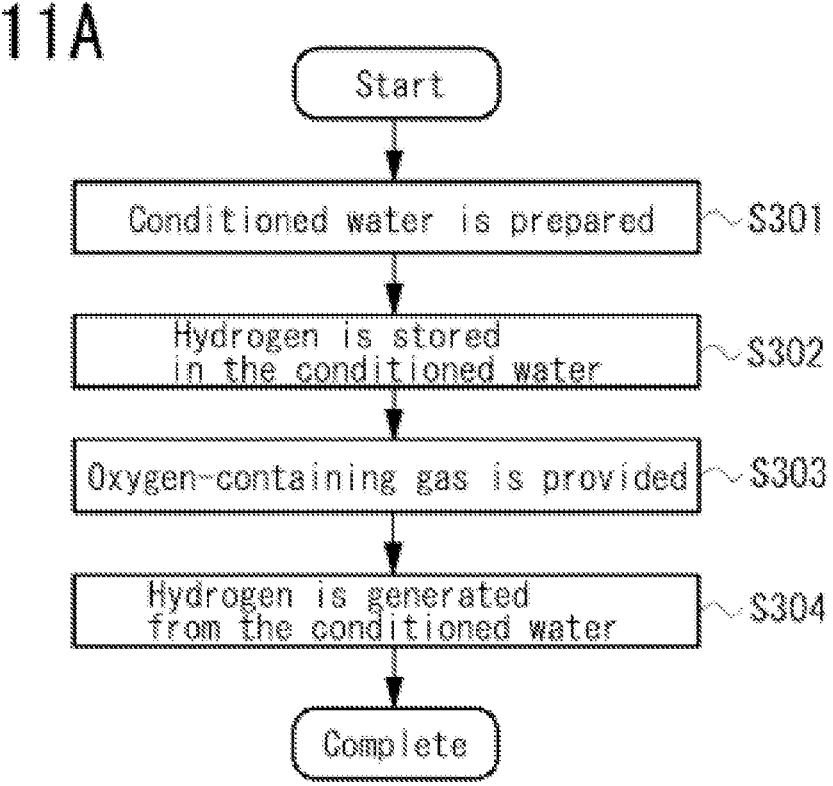
FIGS. 11A and 11B show flowcharts illustrating methods for generating hydrogen according to embodiments of the present invention.
Figure 11B:
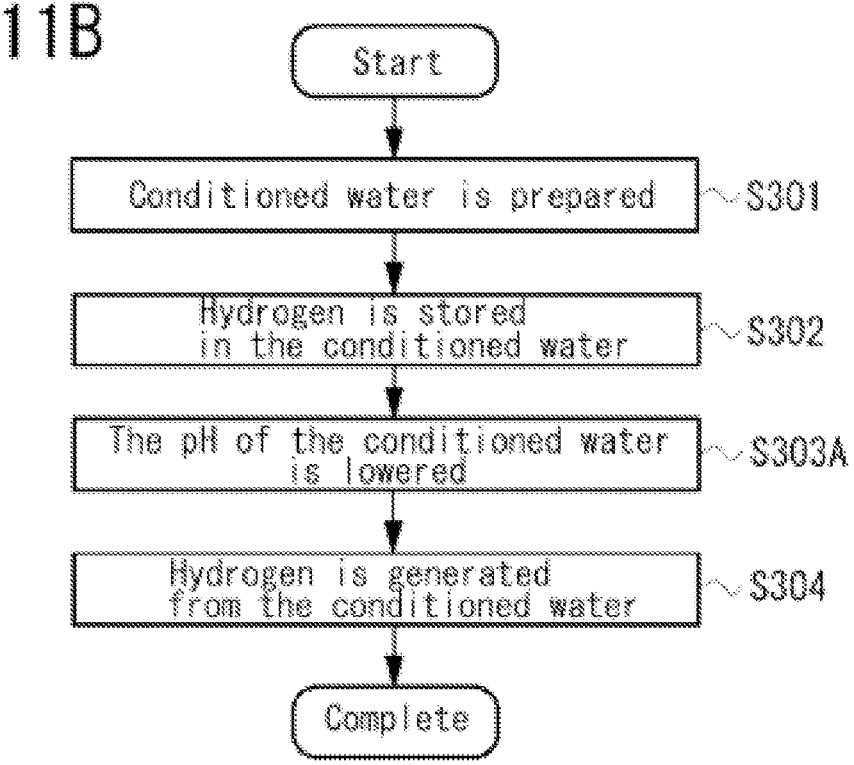

A method for generating hydrogen of the present embodiment is now described. FIGS. 11A and 11B are flowcharts illustrating a method for generating hydrogen. In FIG. 11A, similarly to the method for storing hydrogen, conditioned water is prepared (step S301), and then hydrogen is stored in the conditioned water (step S302). Then, oxygen gas is blown into the conditioned water in which hydrogen is stored (step S303) to cause hydrogen to be generated from the conditioned water (step S304).

As described above in FIG. 7 to FIG. 9, if the conditioned water in which hydrogen is stored is continuously stirred with a stirrer, hydrogen gas is generated after 84 hours have elapsed or after 148 hours have elapsed. It is considered that, in the conditioned water, the hydrogen that is changed into protium becomes in a condition as in $H^0{}_2 \Leftrightarrow H^+ + H^-$, and thus $H^-$ in the water in such a condition are capable of freely changing into hydrogen molecules $H^0{}_2$ anytime. If a certain amount of air or oxygen gas is blown into the water in such a condition, a reaction of $H^+ + H^- \Rightarrow H^0{}_2$ can be caused, and $H^0{}_2$, i.e., hydrogen gas, can be generated from a condition in which dissolved oxygen is zero.

Figure 12:
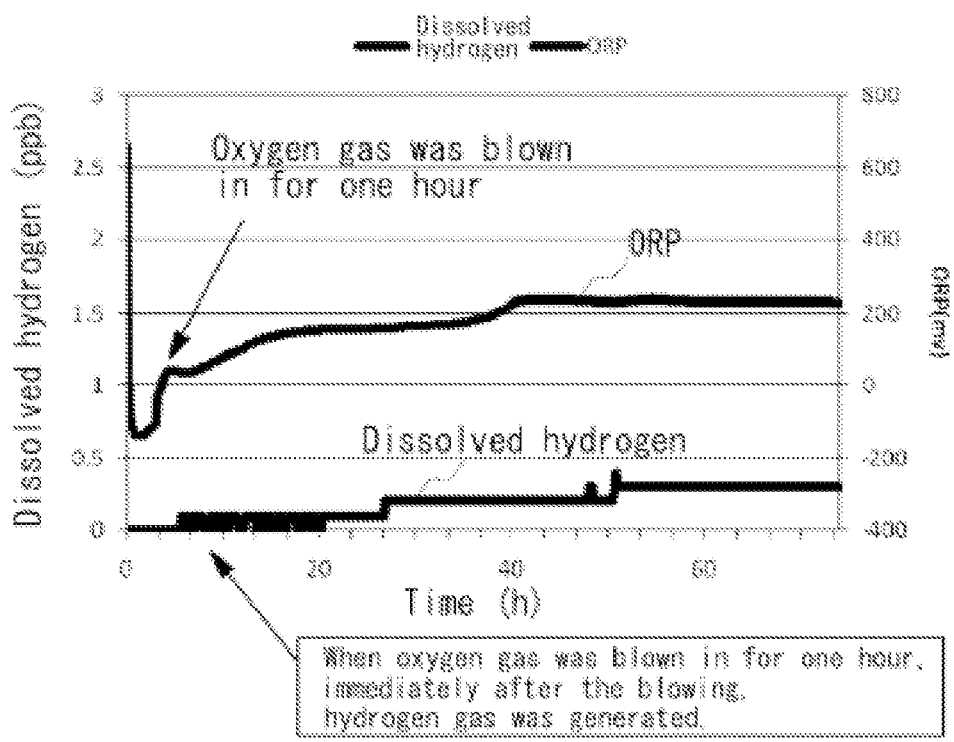
FIG. 12 illustrates the relation between dissolved hydrogen and ORP wherein oxygen gas was blown into conditioned water for one hour.

FIG. 12 illustrates the relation between dissolved hydrogen and ORP wherein oxygen gas was blown into the conditioned water for one hour. If oxygen gas ($O_2$) was blown in for one hour, immediately after the blowing, hydrogen gas was continuously generated for a long time (in the drawing, for more than 80 hours). In addition, ORP gradually increased in proportion to the amount of the generated $H^0{}_2$.

In a method for generating hydrogen shown in the flowchart of FIG. 11B, conditioned water is prepared (step S301), and hydrogen is stored in the conditioned water (step S302), and the pH of the conditioned water is lowered (step S303A) to generate hydrogen from the conditioned water (step S304). The pH of the conditioned water after hydrogen is stored is alkaline (pH is about 9 in the example in FIG. 6), and when the pH is lowered, $H^+$ are increased and hydrogen gas $H^0{}_2$ is generated.

Figure 13:
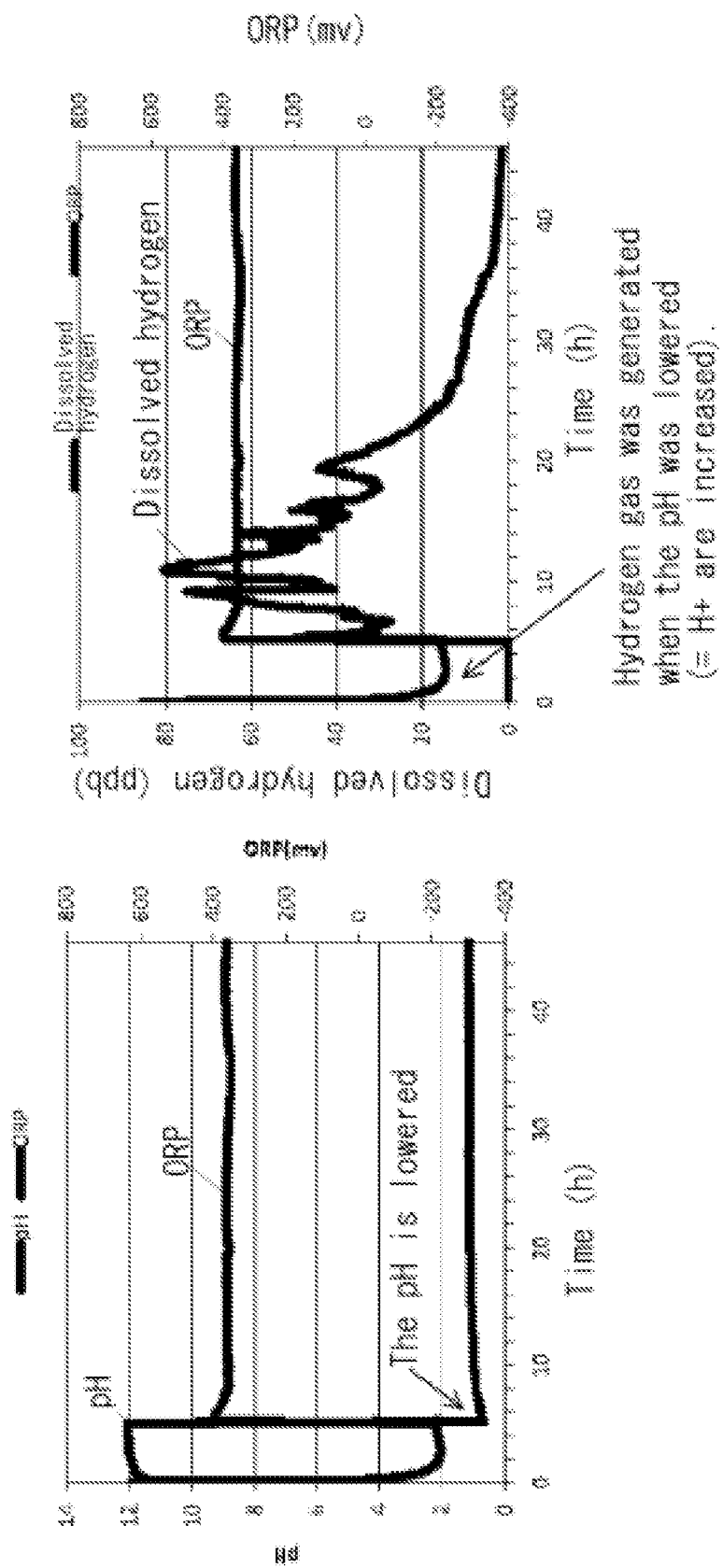
FIG. 13 shows graphs illustrating changes in dissolved hydrogen when the pH of conditioned water was lowered.

FIG. 13 is a graph illustrating changes in dissolved hydrogen when the pH of the conditioned water was lowered. When hydrochloric acid (HCl), for example, was added to the conditioned water to lower the pH of the conditioned water, the pH was changed from alkaline to acid. Synchronously with the change, ORP increased from about −260 mV to about 380 mV. When the pH was lowered, hydrogen gas was abruptly generated, and the amount of the generated hydrogen gradually decreased at about the time 20 hours have passed, and the generation of hydrogen gas continued for about 40 hours.

Figure 14:
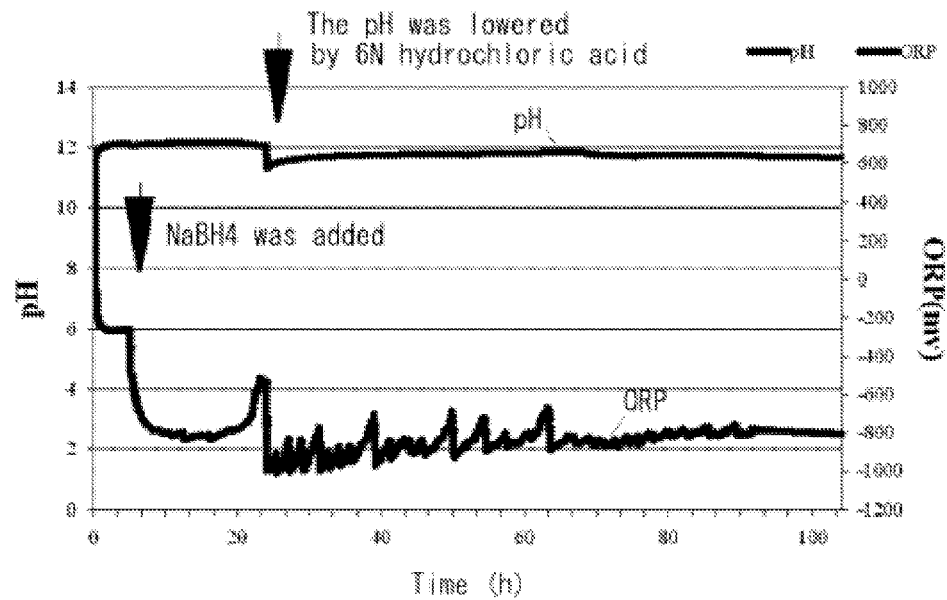
FIG. 14 illustrates changes in pH and ORP wherein sodium borohydride ($NaBH_4$) was added to the conditioned water, and then 6N hydrochloric acid was added thereto.
Figure 15:
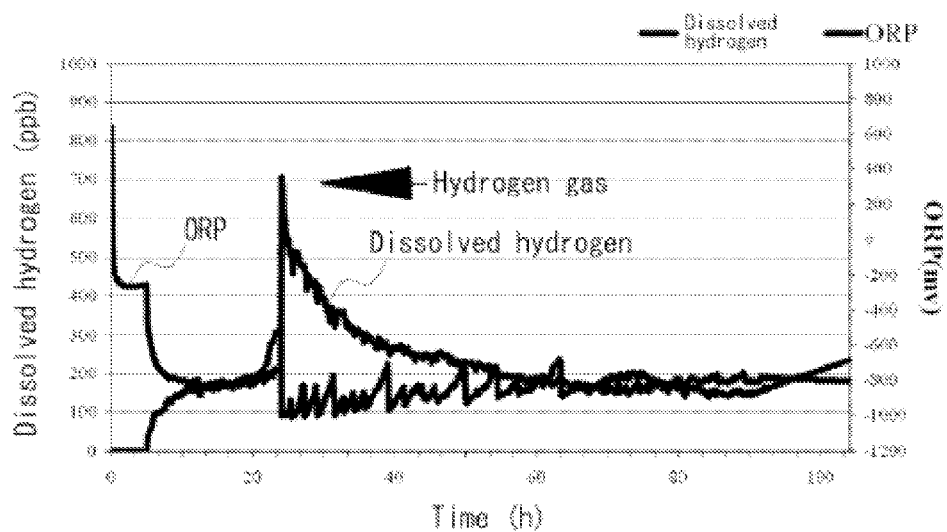
FIG. 15 illustrates changes in dissolved hydrogen and ORP in a condition of FIG. 14.

FIG. 14 illustrates changes in pH and ORP wherein sodium borohydride ($NaBH_4$) was added to the conditioned water, and then 6N hydrochloric acid was added thereto. FIG. 15 illustrates changes in dissolved hydrogen and ORP in a condition of FIG. 14. When sodium borohydride ($NaBH_4$), which is a metal hydride, was added, the ORP of the conditioned water was changed to about −800 mV, and the amount of dissolved hydrogen accordingly increased as shown in FIG. 15. In addition, pH was about 12. After the condition continued for about 20 hours, 6N hydrochloric acid was added to the conditioned water in order to lower pH. When the pH was lowered from about 12 to a little above 11, almost synchronously with the change, hydrogen gas was abruptly generated. At the same time, ORP was increased to about −1000 mV. The generation of hydrogen gas continued, during the time the pH being lowered to a little above 11. In FIG. 15, the generation of hydrogen gas continued for over about 100 hours.

FIG. 16 illustrates temporal changes in ORP wherein sodium borohydride was provided to conditioned water, and then 6N hydrochloric acid was added thereto twice to lower pH. FIG. 17 illustrates temporal changes in dissolved hydrogen (generation of hydrogen gas) in a condition of FIG. 16. As shown in FIG. 17, it was confirmed that, in response to the additions of 6N hydrochloric acid twice, hydrogen gas was significantly generated, and the amount of dissolved hydrogen was about 1200 ppb, which is greater than 700 ppb, the amount of dissolved hydrogen obtained by the addition of 6N hydrochloric acid of hydrogen gas only once (see FIG. 15).

Figure 18:
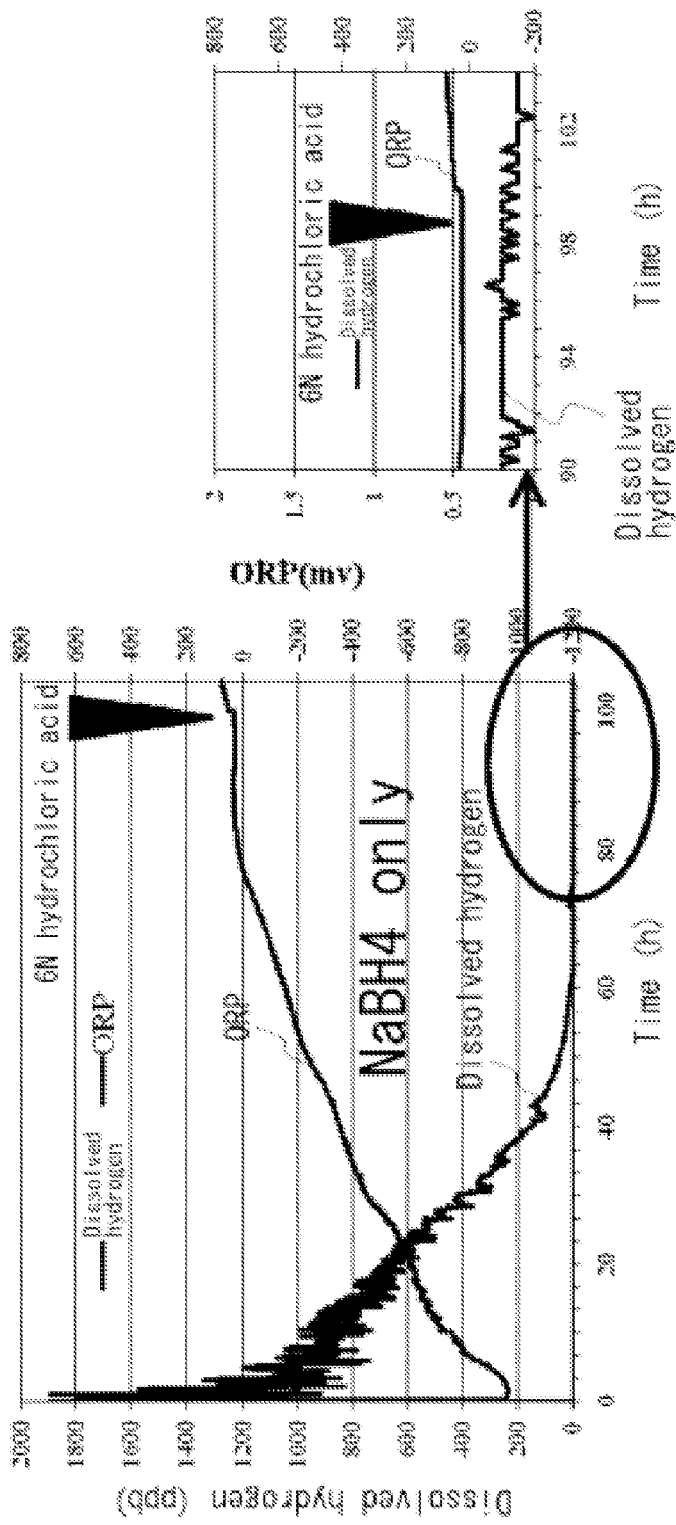
FIG. 18 shows graphs illustrating changes in dissolved hydrogen and ORP wherein 6N hydrochloric acid was added only to sodium borohydride.

FIG. 18 is a graph illustrating changes in dissolved hydrogen and ORP wherein 6N hydrochloric acid was added under the same condition but only to sodium borohydride. In this case, it is confirmed that hydrogen gas was not generated even if 6N hydrochloric acid was added.

Figure 19:
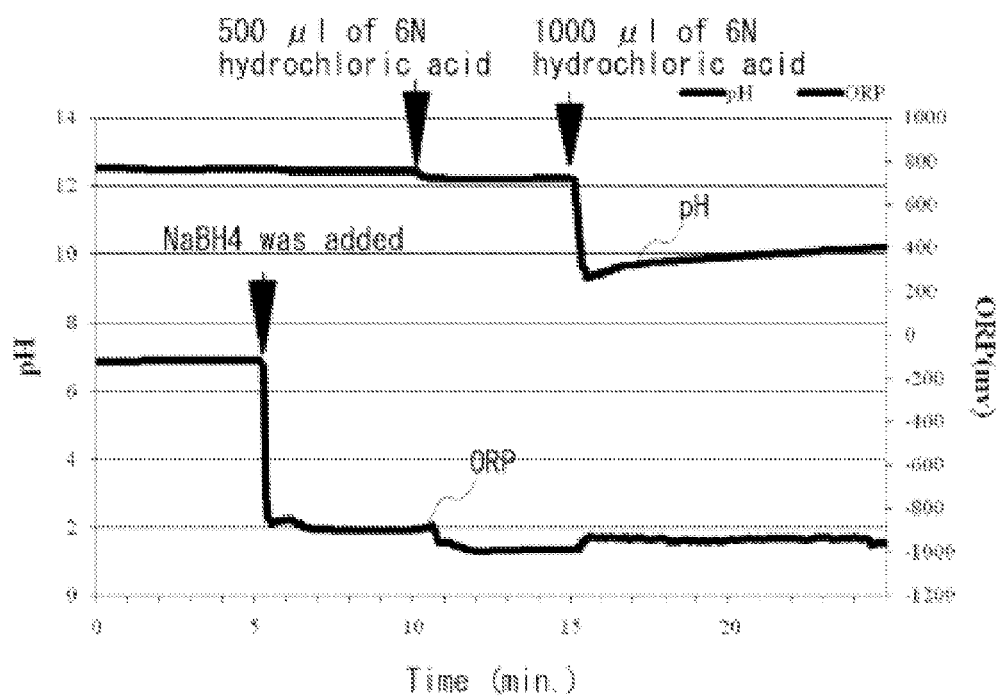
FIG. 19 is a graph illustrating changes in pH and ORP wherein sodium borohydride was added to water that was conditioned with calcium hydride, and then 6N hydrochloric acid was added thereto twice.
Figure 20:
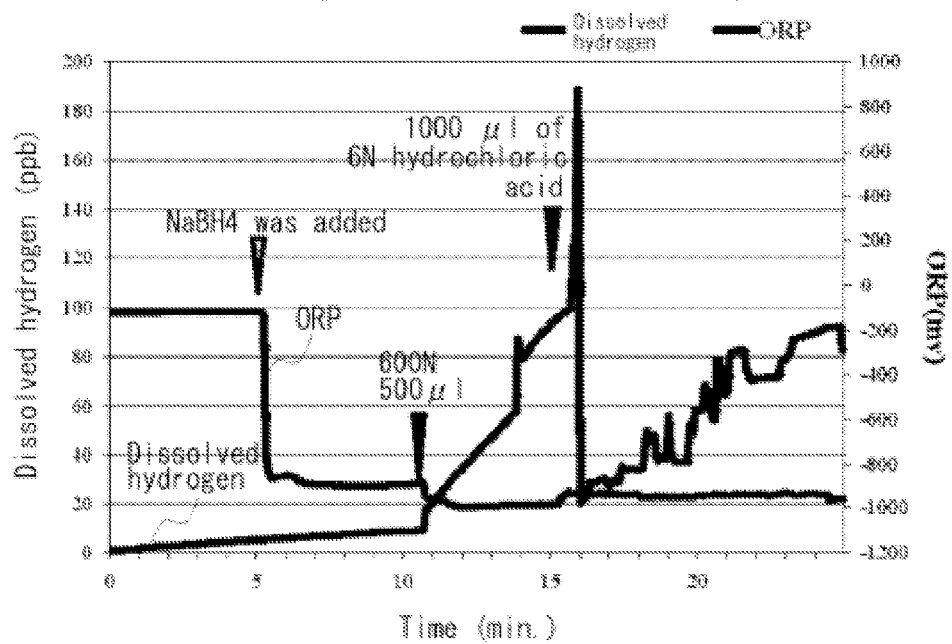
FIG. 20 illustrates changes in dissolved hydrogen and ORP in a condition of FIG. 19.

FIG. 19 is a graph illustrating changes in pH and ORP wherein sodium borohydride was added to water that was conditioned with calcium hydride ($CaH_2$), and then 6N hydrochloric acid was added thereto twice. The amount of 6N hydrochloric acid was 500 μl at a first addition, and 1000 μl at a second addition. FIG. 20 illustrates changes in dissolved hydrogen and ORP in a condition of FIG. 19. Also in FIG. 20, hydrogen gas was generated when 6N hydrochloric acid was added to lower pH, and the generation of hydrogen gas was abruptly increased at the second addition of 6N hydrochloric acid.

Figure 21:
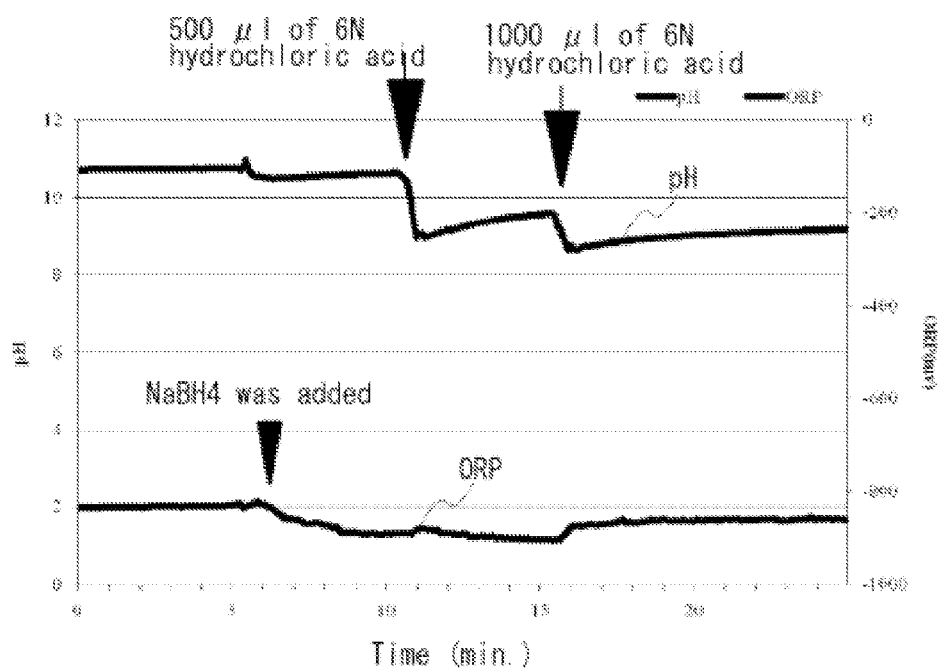
FIG. 21 is a graph illustrating changes in pH and ORP wherein sodium borohydride was added to water that is conditioned with magnesium hydride, and then 6N hydrochloric acid was added thereto twice.
Figure 22:
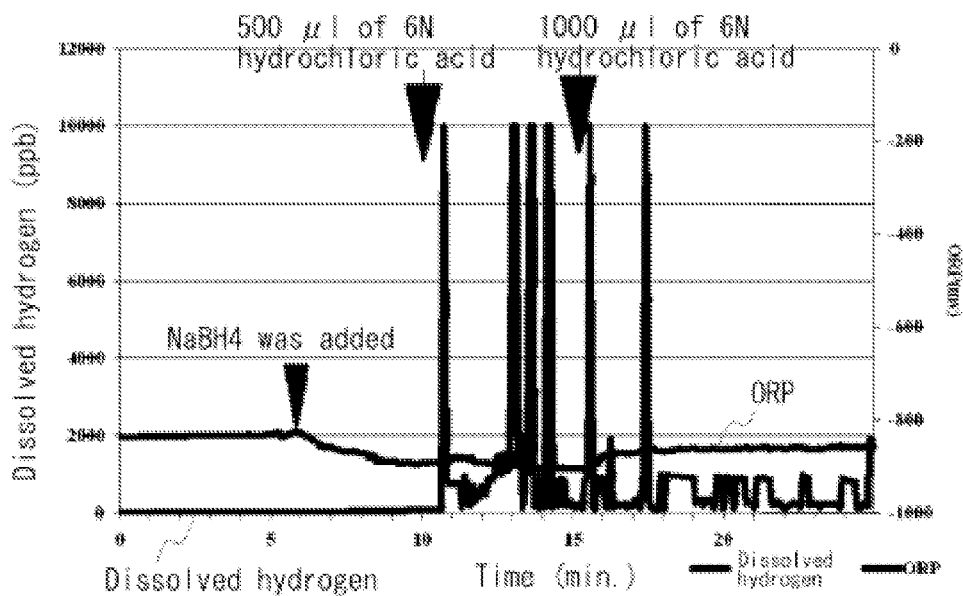
FIG. 22 illustrates changes in dissolved hydrogen and ORP in a condition of FIG. 21.

FIG. 21 is a graph illustrating changes in pH and ORP wherein sodium borohydride was added to water that was conditioned with magnesium hydride ($MgH_2$), and then 6N hydrochloric acid was added thereto twice. FIG. 22 illustrates changes in dissolved hydrogen and ORP in a condition of FIG. 21. Also in FIG. 22, hydrogen gas was generated when 6N hydrochloric acid was added to lower pH, and about 10,000 ppb of dissolved hydrogen was measured.

Figure 23:
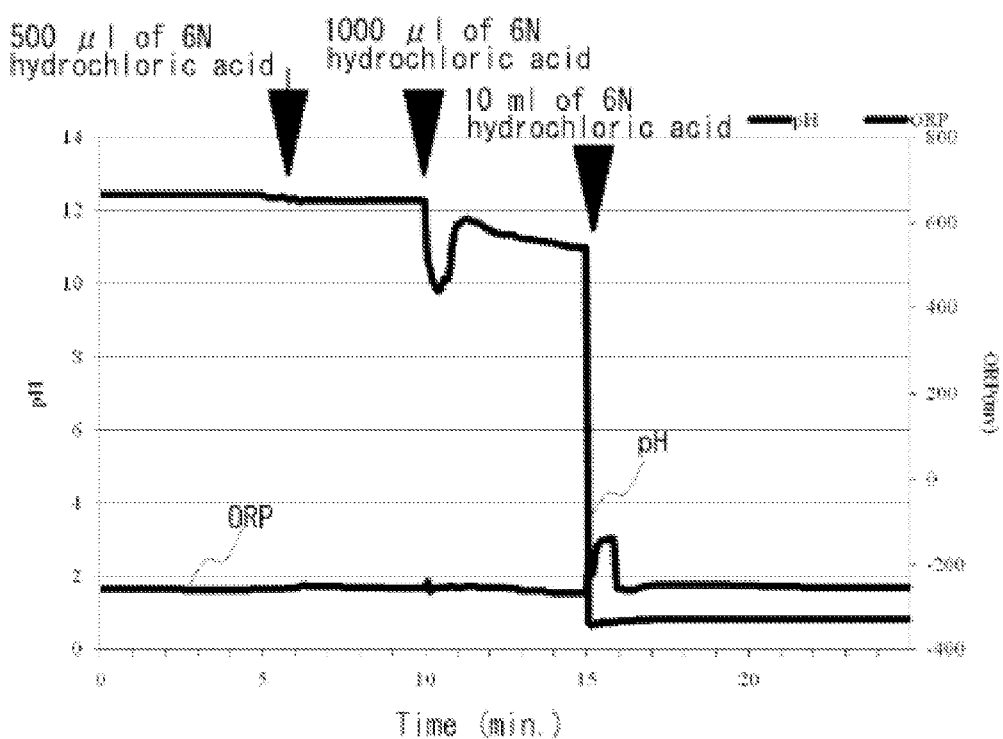
FIG. 23 illustrates temporal changes in pH and ORP wherein 0.4 g of calcium hydride and 0.4 g of magnesium hydride were dissolved in 200 ml of tap water to produce conditioned water, and then 500 µl 1000 µl and 10 ml of 6N hydrochloric acid were added separately in three times.
Figure 24:
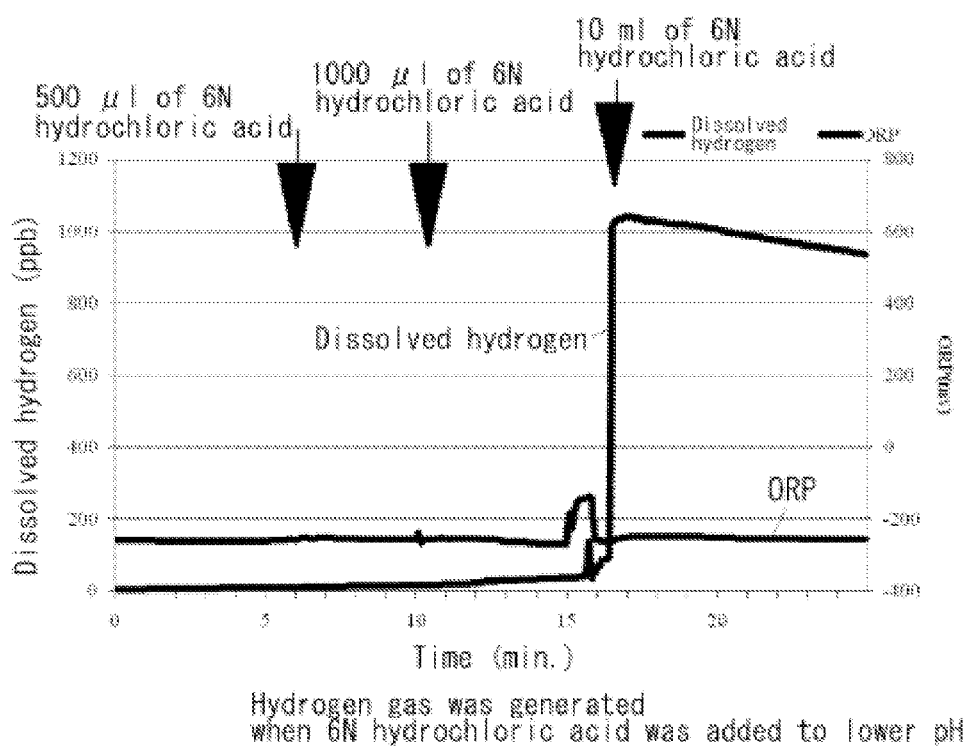
FIG. 24 illustrates generation of hydrogen gas in a condition of FIG. 23.

FIG. 23 illustrates temporal change in pH and ORP wherein 0.4 g of calcium hydride and 0.4 g of magnesium hydride were added to 200 ml of tap water to produce conditioned water, and then 500 μl, 1000 μl, and 10 ml of 6N hydrochloric acid were added separately in three times. FIG. 24 illustrates generation of hydrogen gas in a condition of FIG. 23. By a first addition of 6N hydrochloric acid, pH was slightly lowered and accordingly hydrogen gas was generated slightly. By a second addition of 6N hydrochloric acid, pH was slightly lowered and the generation of hydrogen gas began to slightly increase. When the pH was significantly lowered by a third addition, a large amount of hydrogen gas was generated.

Figure 25:
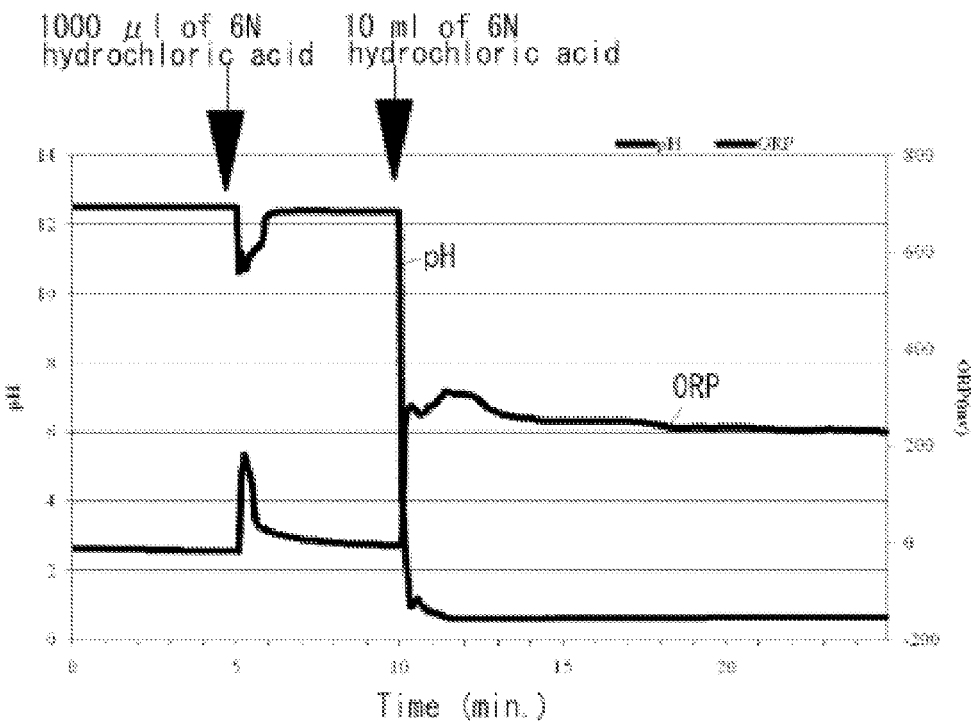
FIG. 25 illustrates temporal changes in pH and ORP wherein 0.8 g of calcium hydride was dissolved in 200 ml of tap water, and then 6N hydrochloric acid was added thereto twice.
Figure 26:
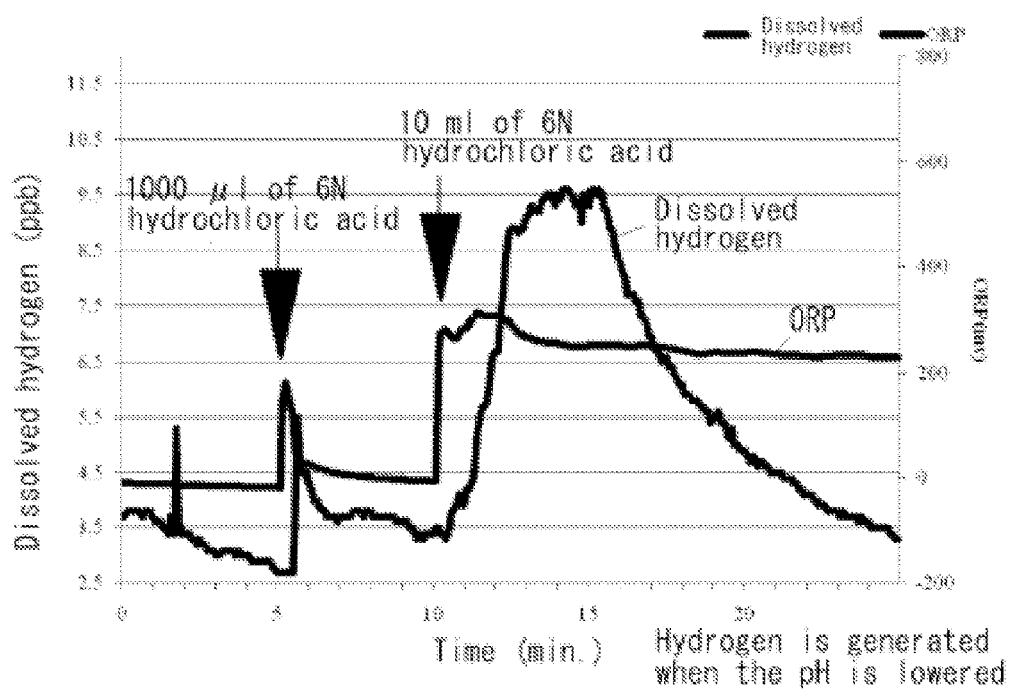
FIG. 26 illustrates temporal changes in dissolved hydrogen and ORP in a condition of FIG. 25.

FIG. 25 illustrates temporal changes in pH and ORP wherein 0.8 g of calcium hydride ($CaH_2$) was dissolved in 200 ml of tap water, and then 6N hydrochloric acid was added thereto twice. FIG. 26 illustrates temporal change in dissolved hydrogen and ORP in a condition of FIG. 25. A supernatant of solution was measured. The amount of 6N hydrochloric acid at a first addition was 1000 μl, and 10 ml at a second addition. By the first addition of 6N hydrochloric acid, pH was lowered and hydrogen gas was generated. By the second addition of 6N hydrochloric acid, pH was significantly lowered and in accordance with the change, the amount of dissolved hydrogen at the maximum reached about 9.5 ppb, and ORP was also increased.

Figure 27:
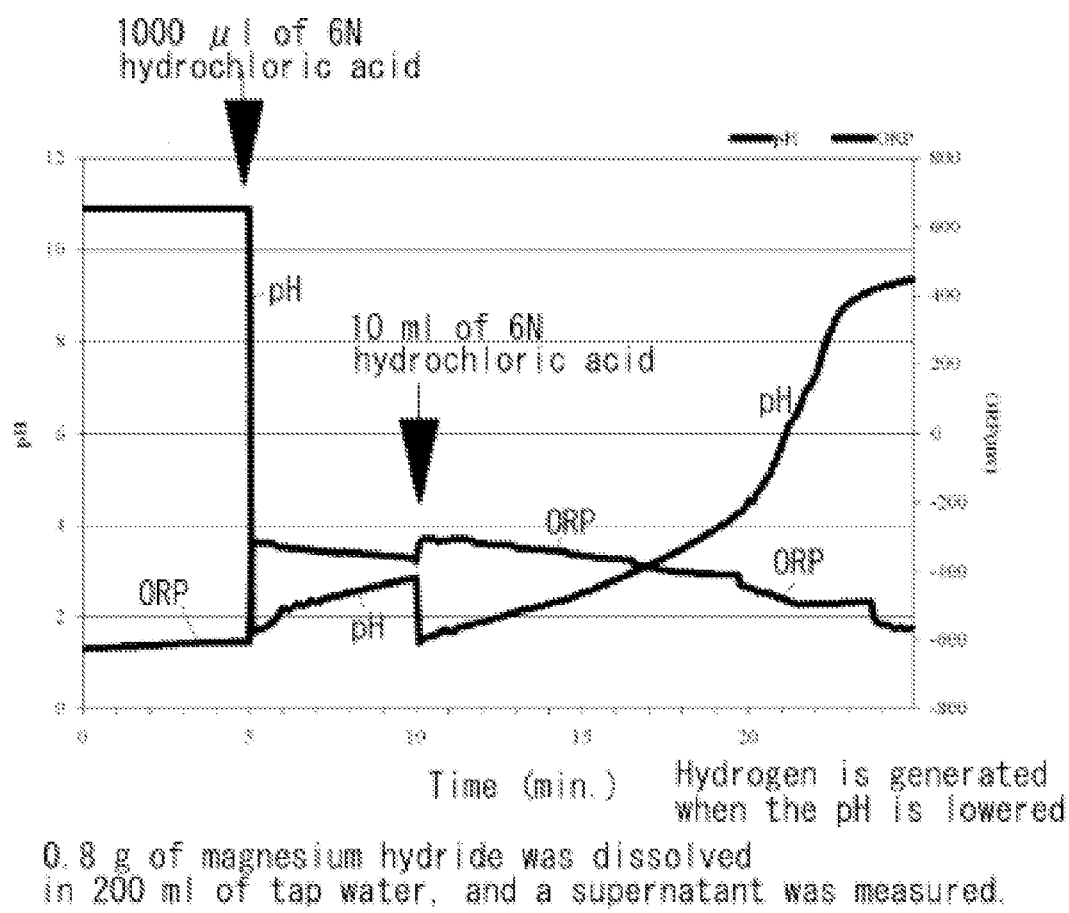
FIG. 27 illustrates temporal changes in pH and ORP wherein 0.8 g of magnesium hydride was dissolved in 200 ml of tap water, and then 6N hydrochloric acid was added thereto twice.
Figure 28:
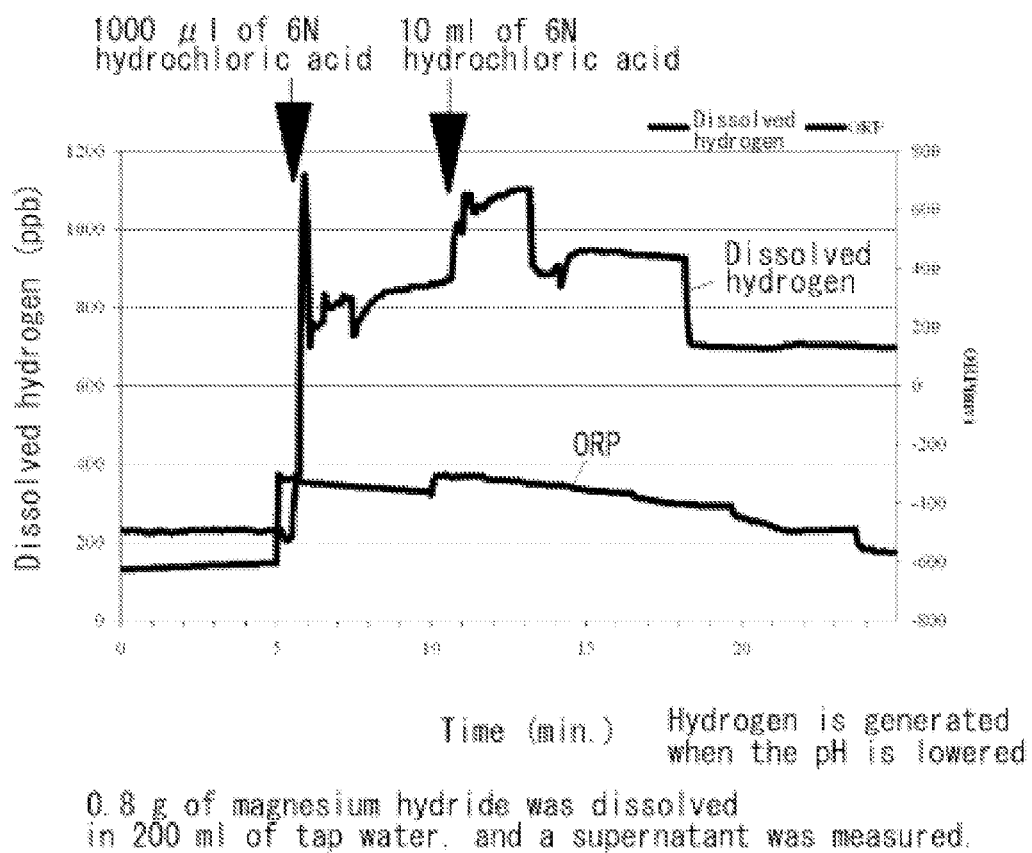
FIG. 28 illustrates temporal changes in dissolved hydrogen and ORP in a condition of FIG. 27.

FIG. 27 illustrates temporal changes in pH and ORP wherein 0.8 g of magnesium hydride was dissolved in 200 ml of tap water, and then 6N hydrochloric acid was added thereto twice. FIG. 28 illustrates temporal changes in dissolved hydrogen and ORP in a condition of FIG. 27. In this case, the amount of 6N hydrochloric acid at a first addition was 1000 μl and 10 ml at a second addition. By the first addition of 6N hydrochloric acid, pH was significantly lowered and accordingly hydrogen gas, an amount of a little above about 1100 ppb at the maximum, was generated. Also by the second addition of 6N hydrochloric acid, hydrogen gas, an amount of a little above 1100 ppb at the maximum, was generated and the condition continued for a long time.

Figure 29:
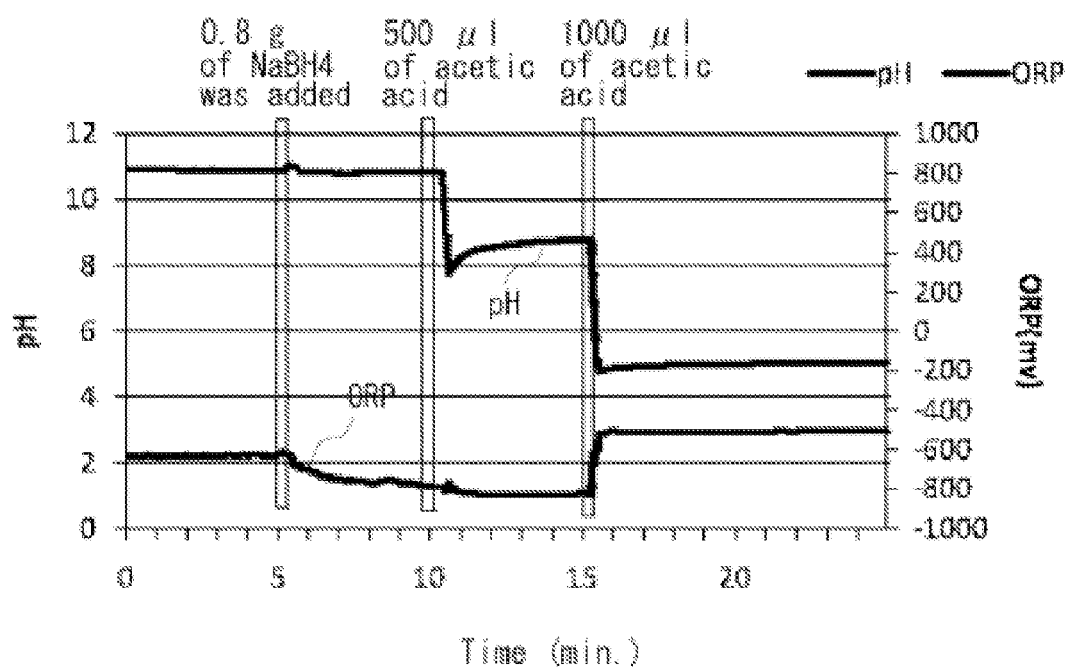
FIG. 29 illustrates temporal changes in pH and ORP wherein sodium borohydride ($NaBH_4$) and acetic acid were added to conditioned water.
Figure 30:
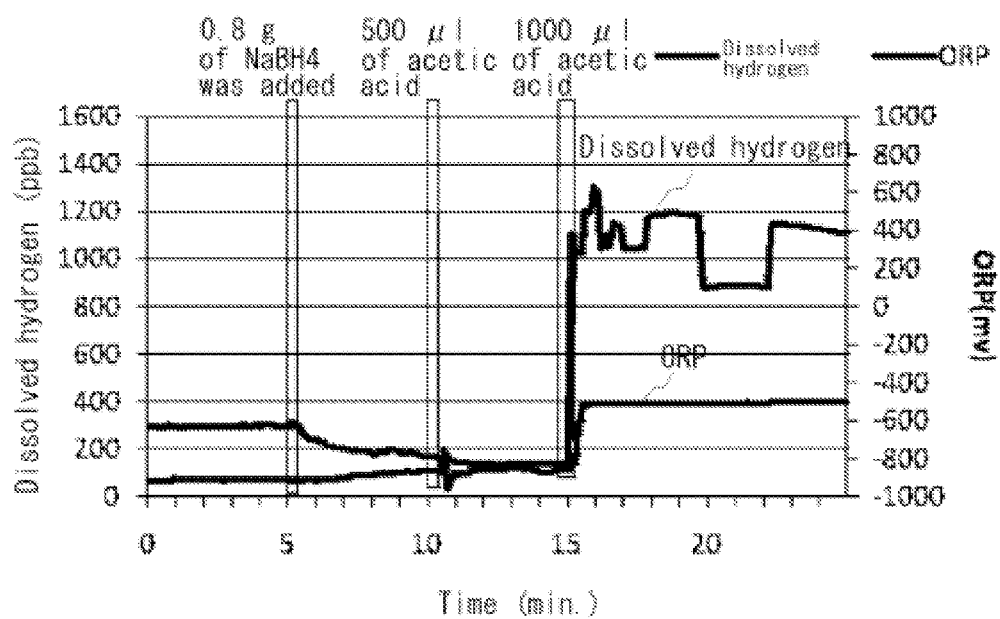
FIG. 30 illustrates temporal changes in dissolved hydrogen and ORP in a condition of FIG. 29.

FIG. 29 illustrates temporal changes in pH and ORP wherein 0.8 g of sodium borohydride (NaBH$_4$) was added to conditioned water, and then 500 µl, 1000 µl of acetic acid were added thereto in order to lower pH. FIG. 30 illustrates temporal changes in dissolved hydrogen and ORP in a condition of FIG. 29. By the addition of the sodium borohydride, ORP was slightly lowered but pH and dissolved hydrogen showed almost no change. By a first addition of acetic acid, pH was lowered and dissolved hydrogen was accordingly slightly increased. It is observed that, by a second addition of acetic acid, pH was significantly lowered, and ORP was increased, and dissolved hydrogen was significantly increased.

Figure 31:
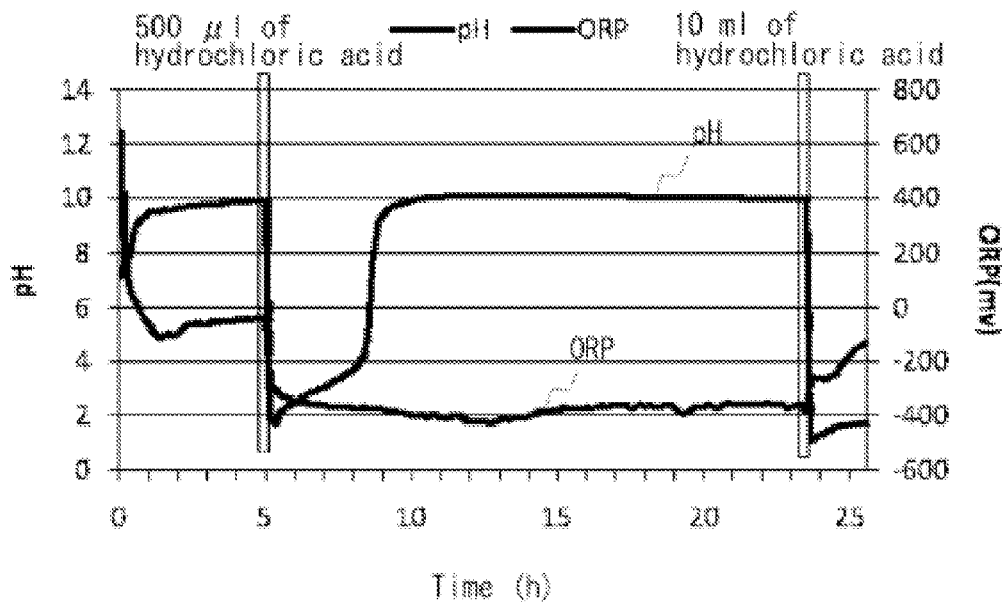
FIG. 31 illustrates temporal changes in pH and ORP wherein hydrochloric acid was added to tap water that contains metal magnesium.
Figure 32:
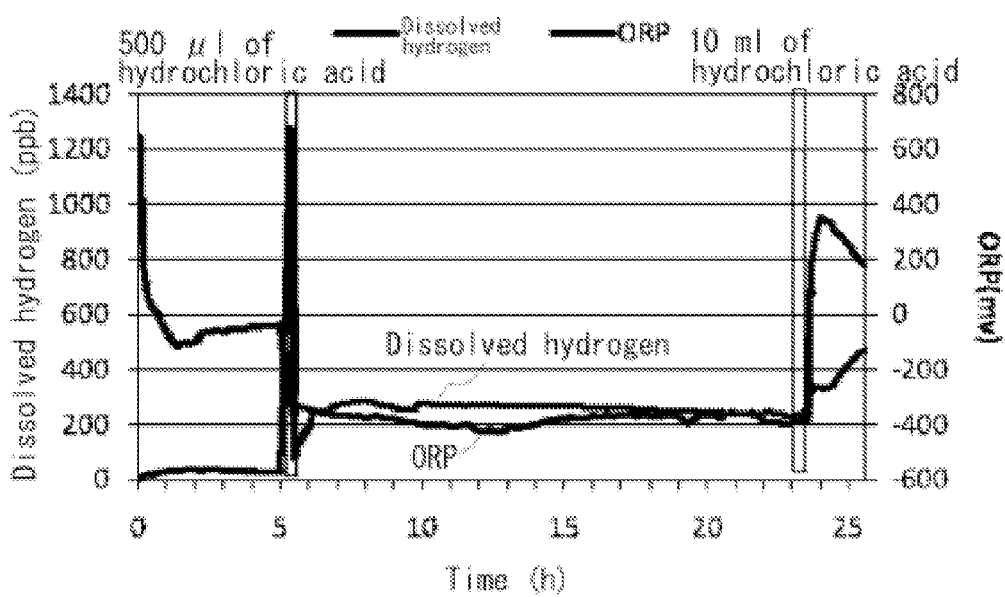
FIG. 32 illustrates temporal changes in dissolved hydrogen and ORP in a condition of FIG. 31.

FIG. 31 illustrates temporal changes in pH and ORP wherein hydrochloric acid was added to tap water that contains metal magnesium. FIG. 32 illustrates temporal change in dissolved hydrogen and ORP in a condition of FIG. 31. The amount of hydrochloric acid at a first addition was 500 µl, and 10 ml at a second addition. By the first addition of hydrochloric acid, pH was significantly lowered and ORP was increased, and dissolved hydrogen was significantly increased, and a large amount of hydrogen was generated.

Figure 33:
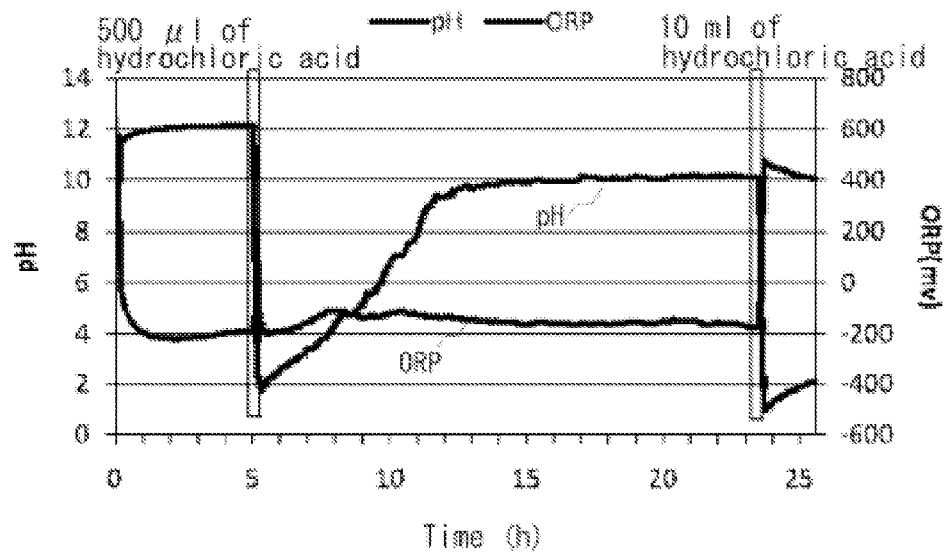
FIG. 33 illustrates temporal changes in pH and ORP wherein metal magnesium and hydrochloric acid were added to conditioned water.
Figure 34:
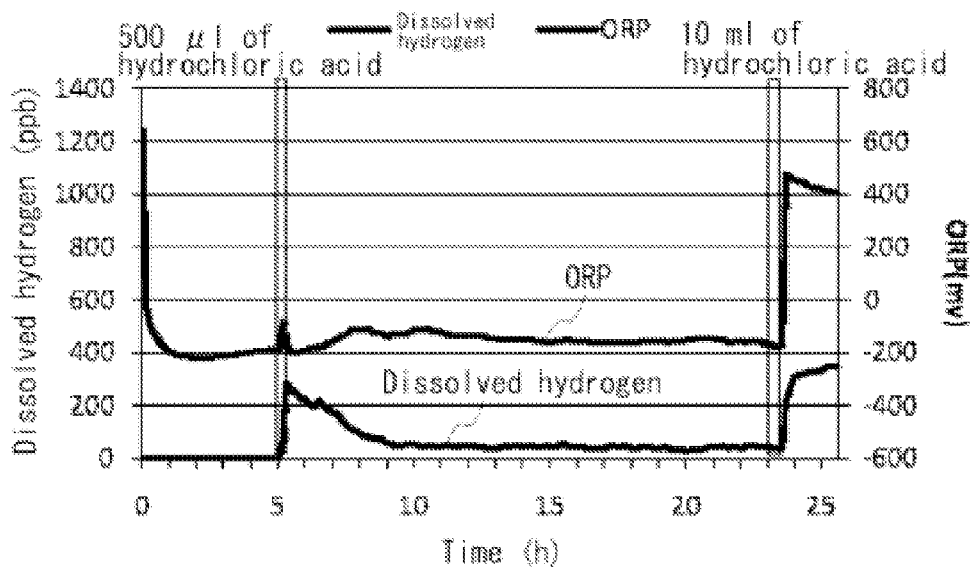
FIG. 34 illustrates temporal changes in dissolved hydrogen and ORP in a condition of FIG. 33.

FIG. 33 illustrates temporal changes in pH and ORP wherein metal magnesium and hydrochloric acid were added to conditioned water in order to lower pH. FIG. 34 illustrates temporal changes in dissolved hydrogen and ORP in a condition of FIG. 33. The amount of hydrochloric acid at a first addition was 500 µl, and 10 ml at a second addition. As previously shown in FIG. 31, a large amount of hydrogen can be generated by the reaction between metal magnesium and hydrochloric acid. If metal magnesium is added to conditioned water and then hydrochloric acid is add thereto, the hydrogen gas generated by the reaction between the metal magnesium and hydrochloric acid is stored in the conditioned water. As shown in FIG. 34, the amount of dissolved hydrogen when the hydrochloric acid was added was far smaller than the amount of dissolved hydrogen in FIG. 32, which means that hydrogen was stored in the conditioned water.

Figure 35:
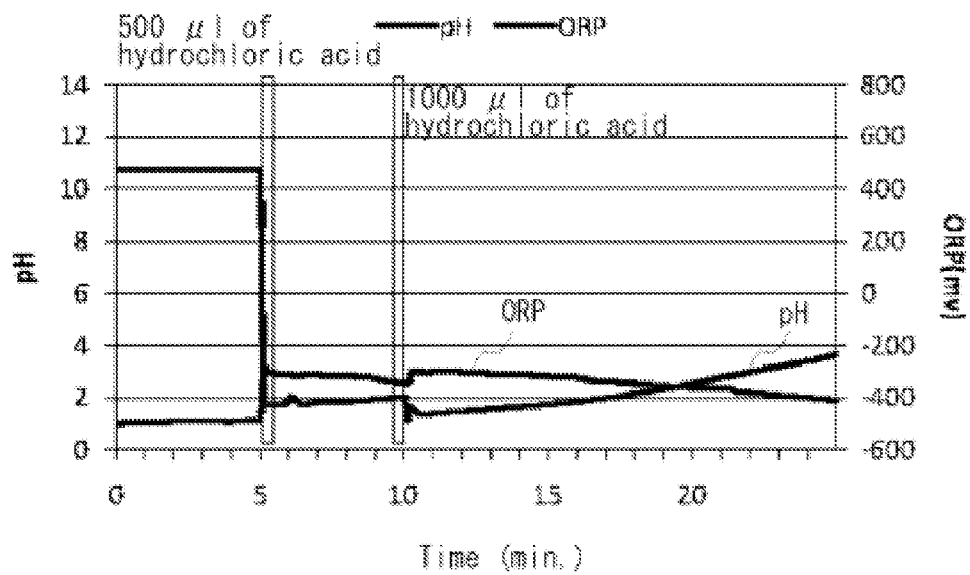
FIG. 35 illustrates temporal changes in pH and ORP wherein metal magnesium was added to water that is conditioned with magnesium hydride, and then hydrochloric acid was added thereto.
Figure 36:
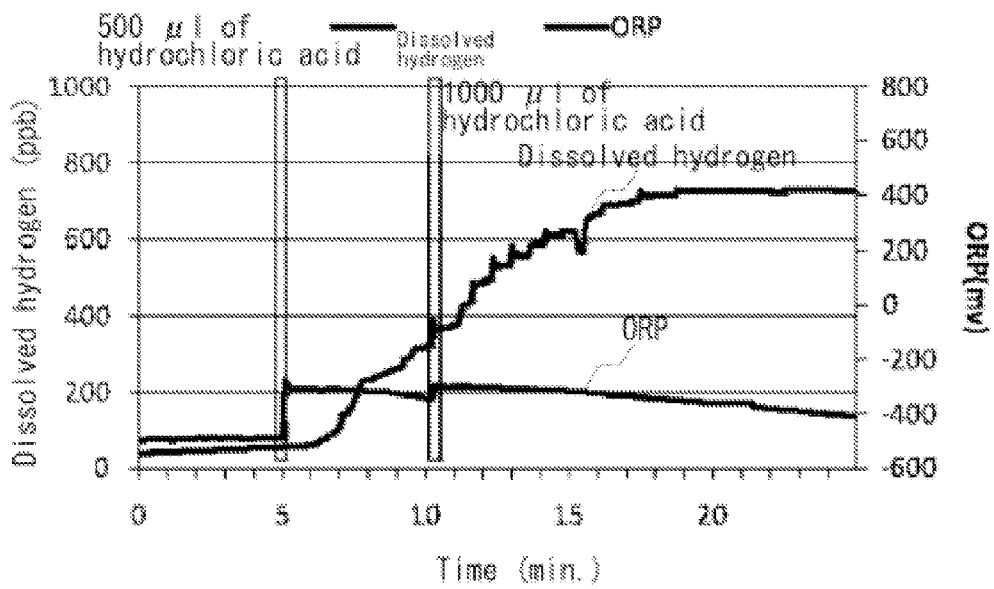
FIG. 36 illustrates temporal changes in dissolved hydrogen and ORP in a condition of FIG. 35.

FIG. 35 illustrates temporal changes in pH and ORP wherein metal magnesium was added to water that was conditioned with magnesium hydride, and then the pH was lowered with hydrochloric acid. FIG. 36 illustrates temporal changes in dissolved hydrogen and ORP in a condition of FIG. 35. The amount of the hydrochloric acid was 500 µl at a first addition, and 1000 µl at a second addition. By the first addition of the hydrochloric acid, pH was significantly lowered and ORP was increased, but there was almost no change in dissolved hydrogen, and the hydrogen generated by the addition of hydrochloric acid was stored in the conditioned water. By the second addition of hydrochloric acid, the lowered pH did not show much change, but dissolved hydrogen was significantly increased, and a large amount of hydrogen gas was generated for a long time.

FIG. 37 illustrates exemplary configuration of apparatuses for generating hydrogen. An apparatus for generating hydrogen 30 comprises a container 32 for containing conditioned water, a container 34 for containing an acid-containing substance, for example, oxygen gas or hydrochloric acid, and a hydrogen generation tank 40. The container 32 for the conditioned water is connected to the hydrogen generation tank 40 through a flow-rate control valve 36 by means of a pipe, for example. The container 34 is connected to the hydrogen generation tank 40 through a flow-rate control valve 38 by means of a pipe, for example. The flow-rate controlled conditioned water and the flow-rate controlled acid-containing substance are provided to the hydrogen generation tank 40, in which hydrogen is generated.

As further shown in FIG. 37, an apparatus for generating hydrogen 30A may have a configuration that comprises a container 32 for containing an oxygen-containing substance and a conditioned water/hydrogen generation tank 42. In this case, the acid-containing substance is provided through a flow-rate control valve 36 to the tank 42, in which conditioned water is contained, and hydrogen is generated from the conditioned water in the tank 42.

Figure 38:
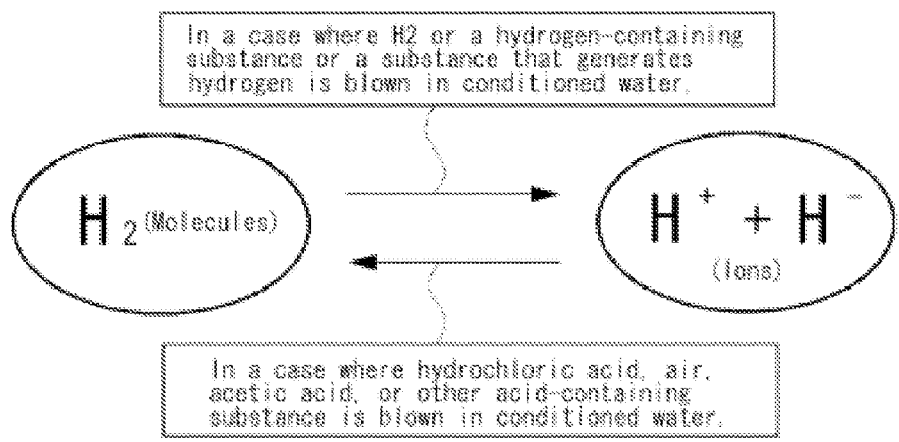
FIG. 38 illustrates a condition of hydrogen storage or hydrogen generation in conditioned water according to an embodiment of the present invention.

FIG. 38 illustrates a condition of hydrogen storage or hydrogen generation in conditioned water according to a present embodiment. In the conditioned water, hydrogen is present in a condition that is changed into protium, in other words, in an ionized condition as in $H^+ + H^-$. When $H_2$ gas or other substance that contains hydrogen; or a substance that generates hydrogen such as Mg is added to the conditioned water, $H_2$ (hydrogen molecules) are stored in the ionized condition of $H^+ + H^-$. On the other hand, when an acid-containing substance, such as oxygen gas ($O_2$), air, hydrochloric acid, acetic acid; or a substance that lowers pH is added to the conditioned water, a reaction of $H^+ + H^- \Rightarrow H^0_2$ is enhanced and hydrogen gas is generated. The property of the water, to which a metal hydride is added, is changed as described above, and the water can stably store hydrogen gas therein and can generate the hydrogen gas when the pH is lowered. In addition, it can be said that the conditioned water is the water in which ionized hydrogen is dissolved=ionized hydrogen water.

The method for storing hydrogen, the method for generating hydrogen, the apparatus for storing hydrogen, and the apparatus for generating hydrogen described in the present embodiments may be used, for example, for a hydrogen battery or a hydrogen engine that uses hydrogen as an energy source. In the storage and generation of hydrogen according to the present embodiments, hydrogen can be stored and generated significantly stably at room temperatures and thus hydrogen can be safely used in, for example, a hydrogen battery or hydrogen engine.

Although preferred embodiments of the present invention have been described in detail, the present invention is not limited to a particular embodiment, and various modifications and changes can be made without departing from the scope of the claimed invention.

What is claimed is:

1. A method for storing hydrogen comprising:
producing water that includes hydrogen which is changed into protium; and
adding a hydrogen-containing gas, sodium borohydride (NaBH$_4$) or a metal hydride to the water to store hydrogen within the water.

2. The method for storing hydrogen according to claim 1, wherein the water comprises $H^+ + H^-$ ions.

3. A method for storing hydrogen comprising:
producing water that includes hydrogen which is changed into protium; and
providing a substance for causing the water to produce hydrogen by reacting with the water, thereby storing hydrogen.

4. The method for storing hydrogen according to claim 3, wherein the water comprises $H^+ + H^-$ ions.

5. The method for storing hydrogen according to claim 3, wherein the water is water treated with a substance comprising a metal hydride selected from the group consisting of an alkali metal, an alkaline earth metal, a Group 13 metal, and a Group 14 metal.

6. A method for generating hydrogen comprising:
producing water including hydrogen which is changed into protium;
providing a hydrogen-containing gas, sodium borohydride ($NaBH_4$) or a metal hydride to the water to store hydrogen; and
lowering pH of the water to generate hydrogen gas.

7. The method for generating hydrogen according to claim 6, wherein the water comprises water treated with a metal hydride, wherein hydrogen is caused to be stored therein by providing hydrogen-containing gas thereto and causing hydrogen to be generated therefrom by adding an acid-containing substance thereto.

8. The method for generating hydrogen according to claim 6, wherein the water is water treated with a metal hydride, wherein hydrogen is caused to be stored therein by providing sodium borohydride thereto and causing hydrogen to be generated therefrom by adding an acid-containing substance thereto.

9. The method for generating hydrogen according to claim 6, wherein the metal hydride is selected from the group consisting of an alkali metal, an alkaline earth metal, a Group 13 metal, and a Group 14 metal hydride.

10. The method for generating hydrogen according to claim 6, wherein the pH is lowered by providing air.

11. The method for generating hydrogen according to claim 6, wherein the pH is lowered by providing oxygen gas.

12. A method for generating hydrogen comprising:
producing water including hydrogen which is changed into protium;
providing a substance for causing the water to produce hydrogen by reacting with the water, thereby storing hydrogen; and
lowering pH of the water to generate hydrogen gas.

13. The method for generating hydrogen according to claim 12, wherein the pH is lowered by providing air.

14. The method for generating hydrogen according to claim 12, wherein the pH is lowered by providing oxygen gas.

15. The method for generating hydrogen according to claim 12, wherein the pH is lowered by providing an acid-containing substance.

16. The method for generating hydrogen according to claim 12, wherein the water comprises $H^+ + H^-$ ions.

17. A method for storing hydrogen comprising:
producing water that includes hydrogen which is changed into protium; and
adding a hydrogen-containing gas to the water to store hydrogen.

18. A method for storing hydrogen comprising:
producing water that includes hydrogen which is changed into protium; and
adding sodium borohydride ($NaBH_4$) to the water to store hydrogen.

19. A method for storing hydrogen comprising:
producing water that includes hydrogen which is changed into protium; and
adding a metal hydride to the water to store hydrogen.

* * * * *